US009757761B2

(12) United States Patent
Angelini et al.

(10) Patent No.: US 9,757,761 B2
(45) Date of Patent: Sep. 12, 2017

(54) METHOD AND APPARATUS FOR LOADING, MELTING AND DELIVERING FLUID FROM A FLUID DELIVERY DEVICE

(71) Applicant: Illinois Tool Works Inc., Glenview, IL (US)

(72) Inventors: Joseph Angelini, Hendersonville, TN (US); Grant McGuffey, Springfield, TN (US); Mel Steven Lessley, Villa Hills, KY (US); Alan Pindrock, Hendersonville, TN (US); Scott Mercer, Hendersonville, TN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 81 days.

(21) Appl. No.: 14/506,241

(22) Filed: Oct. 3, 2014

(65) Prior Publication Data
US 2015/0096626 A1    Apr. 9, 2015

Related U.S. Application Data

(60) Provisional application No. 61/887,116, filed on Oct. 4, 2013, provisional application No. 62/011,765, filed on Jun. 13, 2014.

(51) Int. Cl.
*F16L 53/00* (2006.01)
*B05C 11/10* (2006.01)
(Continued)

(52) U.S. Cl.
CPC ...... *B05C 11/1042* (2013.01); *B05C 11/1047* (2013.01); *B29B 13/022* (2013.01);
(Continued)

(58) Field of Classification Search
CPC ............. B05C 11/1042; B05C 11/1044; B05C 11/1047; B05C 11/11; B29B 13/022; B66C 1/101; B66C 1/223; B66C 1/663
(Continued)

(56) References Cited

U.S. PATENT DOCUMENTS

| 2,831,720 | A | * | 4/1958 | Renfroe ................. B66C 1/625 24/265 R |
| 2,933,198 | A | * | 4/1960 | Firestone ............... A61B 6/102 187/250 |

(Continued)

FOREIGN PATENT DOCUMENTS

DE    9313524 U1    10/1993

OTHER PUBLICATIONS

Invitation to Pay Additional Fees and Partial Search for International Application No. PCT/US2014/059121, dated Dec. 10, 2014.

*Primary Examiner* — Nicholas J Weiss
(74) *Attorney, Agent, or Firm* — Levenfeld Pearlstein, LLC

(57) ABSTRACT

A fluid delivery device is provided. The fluid delivery device includes a melter having a loading chamber and a hopper disposed in communication with the loading chamber, the loading chamber having one or more heating elements. The hopper includes a second heating element. The melter also includes a container handling system for lifting a container a predetermined height and moving the container from a position remote of the melter to a position within the loading chamber. The container includes contents stored within. The heating elements heat the contents so that the contents may be received in the hopper. The hopper may continue to heat the contents to provide a fluid. The fluid may be discharged from the hopper by way of a pump assembly. A pressure of fluid may be regulated at the pump assembly.

17 Claims, 14 Drawing Sheets

(51) Int. Cl.
*B29B 13/02* (2006.01)
*B66C 1/10* (2006.01)
*B05C 11/11* (2006.01)

(52) U.S. Cl.
CPC ............... *B66C 1/101* (2013.01); *B05C 11/11* (2013.01); *Y10T 137/0391* (2015.04); *Y10T 137/6416* (2015.04)

(58) Field of Classification Search
USPC ............................ 222/146.2, 146.5, 52, 325
See application file for complete search history.

(56) References Cited

U.S. PATENT DOCUMENTS

| | | | | |
|---|---|---|---|---|
| 3,052,441 A | * | 9/1962 | Fleischman | B62B 3/104 |
| | | | | 248/141 |
| 3,261,637 A | * | 7/1966 | Bopp | B66C 1/62 |
| | | | | 294/110.1 |
| 4,821,922 A | * | 4/1989 | Miller | B29B 13/022 |
| | | | | 177/184 |
| 4,919,308 A | | 4/1990 | Majkrzak | |
| 5,489,032 A | * | 2/1996 | Mayhall, Jr. | E04G 21/22 |
| | | | | 182/129 |
| 5,538,382 A | * | 7/1996 | Hasegawa | B65G 67/603 |
| | | | | 212/319 |
| 5,680,961 A | * | 10/1997 | Boccagno | B05C 11/1042 |
| | | | | 219/421 |
| 5,775,542 A | * | 7/1998 | Field | F27D 99/00 |
| | | | | 141/82 |
| 9,296,009 B2 | * | 3/2016 | Bacco | B05C 11/1013 |
| 2007/0290000 A1 | | 12/2007 | Jacquemin-Verguet et al. | |

* cited by examiner

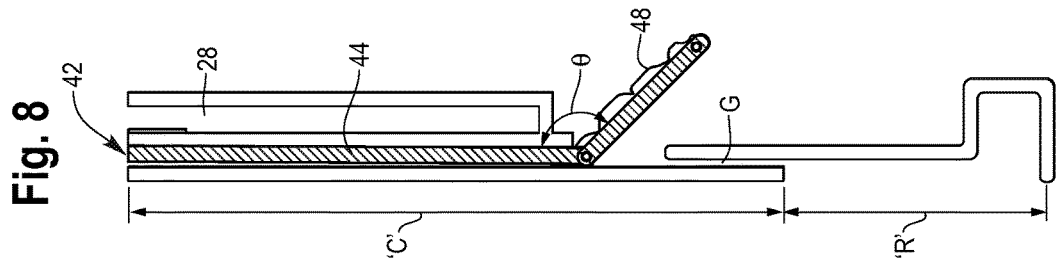
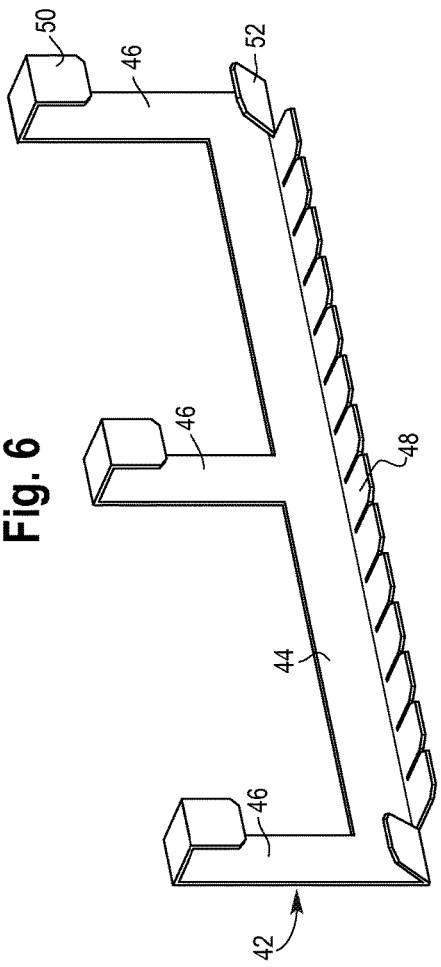
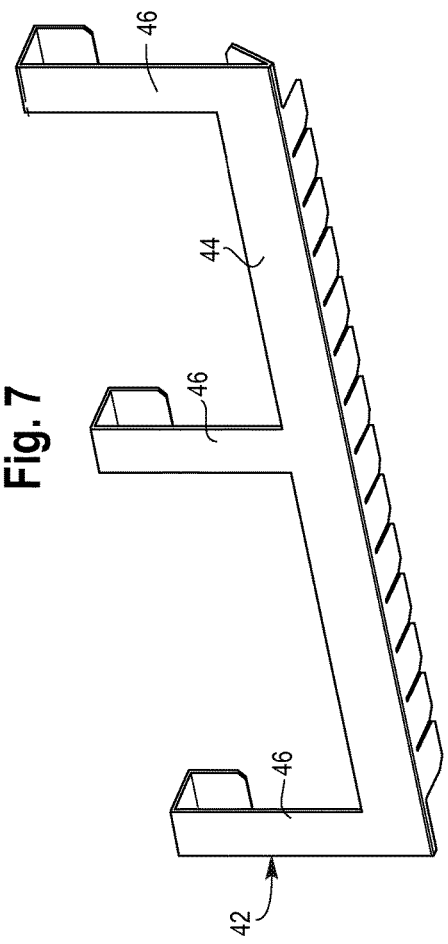

METHOD AND APPARATUS FOR LOADING, MELTING AND DELIVERING FLUID FROM A FLUID DELIVERY DEVICE

BACKGROUND

The following description relates to a device for loading a container having contents therein, melting the contents and delivering the melted contents, i.e., a fluid, to a device for applying the fluid onto an article.

A traditional hot melt system includes a melting unit for melting a hot melt adhesive and an application device for applying the adhesive on an article. Generally, the melting unit is fluidically coupled to the application device and delivers the melted adhesive to the application device.

The melting unit is configured to receive a supply of hot melt adhesive initially in a solid form. The solid hot melt adhesive is typically stored in a container, such as a 55 gallon drum, that is loaded into the melting unit. To load the melting unit, the drum is typically positioned on a platform or other surface within a support structure of the melting unit. An upper end of the drum is open, exposing the hot melt adhesive.

The melting unit may include a drive mechanism configured to drive a heated member into hot melt adhesive through the open end of the drum. The drive mechanism is typically a piston system that may be, for example, hydraulically powered. The heated member is typically a plunger in the form of, for example, a platen or cylinder that is driven into, or into contact with, the hot melt adhesive by the piston assembly. The heated member contacts the adhesive and causes the adhesive to melt. The melted adhesive may be drawn away from the drum for use with an application device.

To replace an empty drum, the melting unit is stopped, i.e., the piston is withdrawn from the drum, the drum is removed, and then replaced with a full hot melt adhesive drum. During this time, the application device may be stopped as well. Thus, a situation may arise where the melted adhesive may not be applied to an article while the drum of hot melt adhesive is being replaced. That is, replacing a drum of hot melt adhesive in the melting unit may disrupt the flow of melted adhesive to the application device, thereby disrupting the application of adhesive to an article. Accordingly, it may be required to shutdown or idle the system to replace the hot melt adhesive drum. As a result, manufacturing time may be increased due to non-continuous operation of the melting unit and application device.

Some hot melt systems may include two or more individual melting units. Thus, when a drum in one melting unit is emptied, hot melt adhesive may be melted and drawn from another adhesive drum in another melting unit. In this configuration, an empty drum may be replaced while adhesive is drawn from another drum and supplied to the application device. Accordingly, a steady supply of melted adhesive may be supplied to the application device.

However, this configuration requires excess components and increases complexity. For example, as described above, this configuration uses two or more melting units instead of one, and requires the implementation of additional pumps and other associated equipment for delivery of the melted adhesive to the application device.

Smaller scale melting units are known, where a hopper may define a receptacle having heated surfaces therein. A supply of hot melt adhesive may be added to the hopper as necessary, melted, and discharged. However, with this device the hopper is not suited to receive a 55 gallon drum of hot melt adhesive. Rather, the hopper is sized to accept smaller amounts of hot melt adhesive, for example, as shavings or pellets. Thus, extra processing of the hot melt adhesive slug is required to provide a supply suitable for use with this type of device. Moreover, due the limited size of the device, the hopper may need to be frequently refilled, increasing labor costs.

Further, in a facility where the hot melt system is installed, vehicles, cranes, people or other moving devices or equipment may pass by the hot melt system in close proximity thereto. The possibility exists that the moving devices or objects may inadvertently come into contact with external or exposed portions of the hot melt system or the drum, potentially damaging the drum or external portions of the hot melt device. Further, the hot melt adhesive, as it is melted in the drum, may be exposed to surrounding environs, and in some cases, may bubble or splatter and come into contact with objects in close proximity thereto.

Accordingly, it is desirable to provide a fluid delivery device that may provide a continuous output of fluid and provide an enclosed area for transport and/or melting of the adhesive. In addition, it is desirable to provide a fluid delivery device where delivery of the fluid from the device may be individually, independently metered to different metering or application devices.

SUMMARY

According to one aspect, there is provided a fluid delivery device. The fluid delivery device includes a melter having a loading chamber and a hopper disposed in communication with the loading chamber. The loading chamber includes an opening and one or more first heating elements disposed therein. The hopper includes a second heating element disposed therein. The fluid delivery device also includes a container handling system configured to lift a container having contents stored therein in a first direction to a predetermined height, and to move the container in a second direction from a position remote of the melter to a position within the loading chamber. An access area defines a perimeter adjacent to the melter, the access area including an access section configured to allow access to an interior area defined by the access area. A pump system is disposed in fluid communication with the hopper. The pump system includes at least one pump, at least one inlet in fluid communication with the hopper and at least one output port. The loading chamber is configured to receive the container through the opening. The one or more flexible heating elements are configured to heat the contents within the container. The hopper is configured to receive and melt the contents from the container to provide a fluid and the pump system is configured to deliver the fluid from the hopper to one or more remotely positioned metering stations or fluid application devices.

According to another aspect, there is provided a fluid delivery device having a melter, a pump system and a container handling system. The melter includes a loading chamber and a hopper disposed in communication with the loading chamber. The loading chamber includes an opening, a door selectively movable across the opening, and one or more flexible heating elements disposed within the loading chamber. The hopper includes a second heating element disposed therein. The pump system is in fluid communication with the hopper and is configured to deliver a fluid from the hopper to one or more remotely positioned fluid application or metering devices. The container handling system is configured to lift a container and to move the container from a position remote of the melter to a position within the loading chamber. The loading chamber is disposed above the hopper.

According to still another aspect, there is provided a method of operating a fluid delivery device. The fluid delivery device includes a melter having a loading chamber and a hopper disposed in communication with the loading chamber. The loading chamber has an opening and one or more heating elements disposed within the loading chamber. The hopper includes a second heating element disposed therein. A container handling system is configured to lift a container having contents stored therein in a first direction to a predetermined height, and to move the container in a second direction from a position remote of the melter to a position within the loading chamber. A pump system is disposed in fluid communication with the hopper. The pump system includes at least one pump and at least one output port. The method includes lifting the container to a predetermined height, moving the container from a position remote from the melter to a position within the loading chamber, moving a door of the loading chamber from an open position to a closed position, moving the one or more heating elements from a receiving position to a heating position, energizing the one or more heating elements to heat the container and the contents stored therein, receiving the contents of the container in the hopper, melting the contents within the hopper to provide a fluid, discharging the fluid from the hopper, and regulating the pressure of the fluid discharged from the hopper with at least one pressure regulating valve.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 6 is a rear view of a lead-in skirt guard according to an embodiment described herein;

FIG. 7 is a front view of the lead-in skirt guard of FIG. 6;

FIG. 8 is a diagram showing a cross-section of the lead-in skirt guard of FIG. 6 positioned relative to the heating element and a container, according to an embodiment described herein;

DETAILED DESCRIPTION

Figure 1:
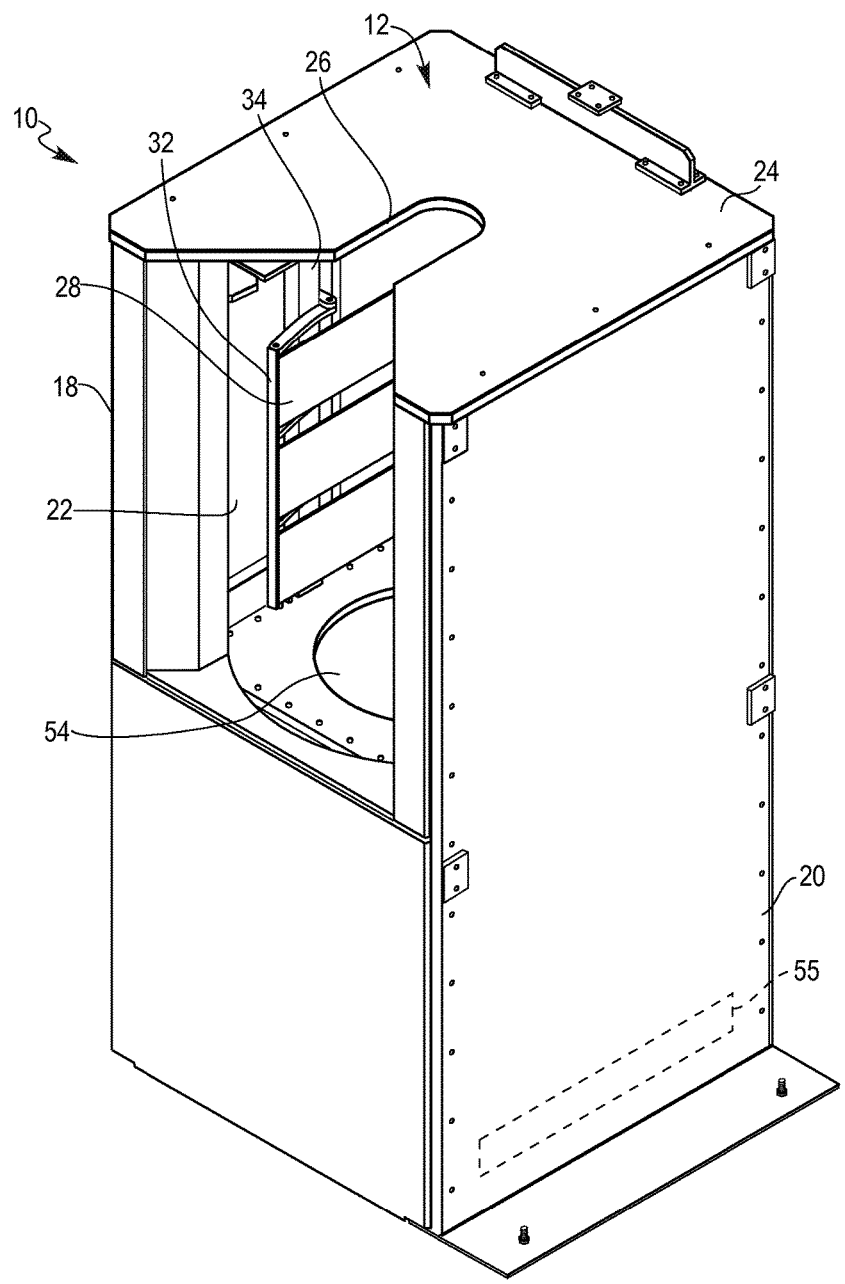
FIG. 1 is a perspective view of a melter of a fluid delivery device having a door in an open position according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

According to the embodiments described herein, and with reference to FIGS. 1-21, a fluid delivery device 10 may include a melter 12, a container handling system 14, and a pump assembly 16. The fluid delivery device 10 is configured to load, melt and discharge or deliver contents of a container 'C'. For example, the fluid delivery device 10 may be a hot melt device, and the contents may be a hot melt adhesive. Thus, the fluid delivery device 10 may melt and deliver the hot melt adhesive to one or more metering stations and/or fluid application devices (not shown). The fluid application device may then apply the melted adhesive to an article, such as, but not limited to, a fabric or strand of material. For example, the fluid application device may be used in strand coating applications, where a nozzle of the fluid application device discharges the melted adhesive onto a strand of material, such that strand may be subsequently bonded to a substrate, such as a woven or non-woven fabric. Alternatively, the fluid application device may apply the adhesive directly to a substrate, such as the woven or non-woven fabric. The nozzle of the fluid application device may be either a contact or non-contact nozzle. In some embodiments, the fluid delivery device 10 described herein may be used with one or more fluid application devices to dispense adhesives for use in disposable hygiene products, such as a baby diapers, adult diapers, feminine hygiene products, medical or hospital pads, and other non-woven applications.

FIG. 1 shows a perspective view of the melter 12 of the fluid delivery device 10 according to one embodiment. The melter 12 includes a loading chamber 18 and a hopper 20 in fluid communication with the loading chamber 18. The loading chamber 18 includes an opening 22 through which a supply of hot melt adhesive may be received in an interior portion of the loading chamber 18. In one embodiment, the loading chamber 18 and opening 22 are shaped and configured to receive a hot melt adhesive supply in the container 'C', for example a 55 gallon drum. The loading chamber 18 may also include a cover 24 configured to substantially cover the chamber 18. The cover 24 may include a slot 26 to allow a portion of the container handling system 14 to extend into the interior of the loading chamber 18 as described further below. Further, in some embodiments, the loading chamber 18 may also include a manual loading door (not shown) on side different from the side having the opening 22. The manual loading door may be opened to allow access to the interior of the loading chamber 18 so that the container 'C' may be manually loaded into the melter 12.

Figure 2:
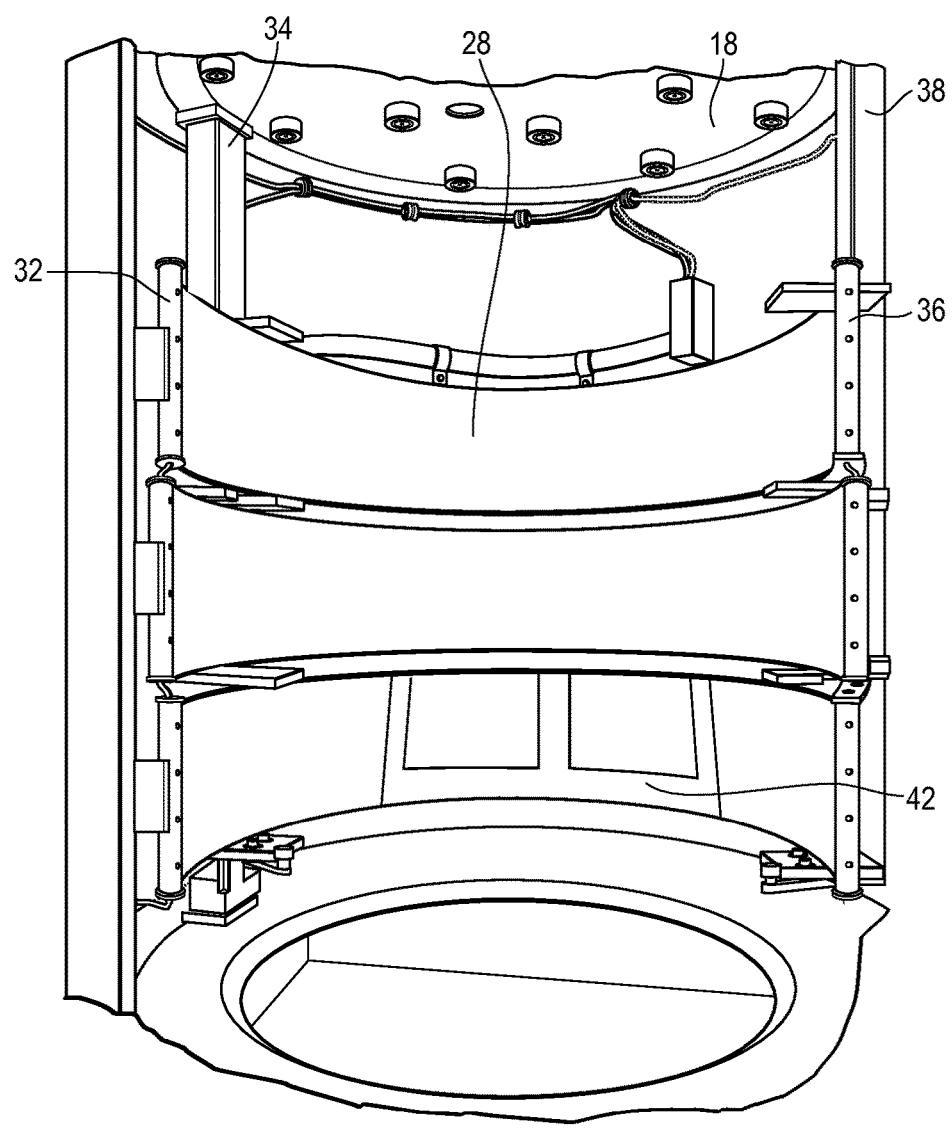
FIG. 2 is a front view of a loading chamber of the melter of FIG. 1 showing a heating element in a receiving position, according to an embodiment described herein.

FIG. 2 is a front view of the loading chamber 18 through the opening 22, according to one embodiment. Referring to FIGS. 1 and 2, the loading chamber 18 further includes a first heating element 28. In one embodiment, the first heating element 28 may be one or more flexible heating elements 28 and include, for example, one or more flexible heating bands 28. For example, as shown in FIGS. 1 and 2, the first heating element 28 may include three flexible heating bands 28. The heating bands 28 may be made from a metallic material configured to face and/or be brought into contact with the container 'C' to transfer heat to the container, and in turn, the hot melt adhesive within the container. An outer surface, i.e., a surface facing away from the container, of the heating bands 28 may covered by an insulating material.

Figure 3:
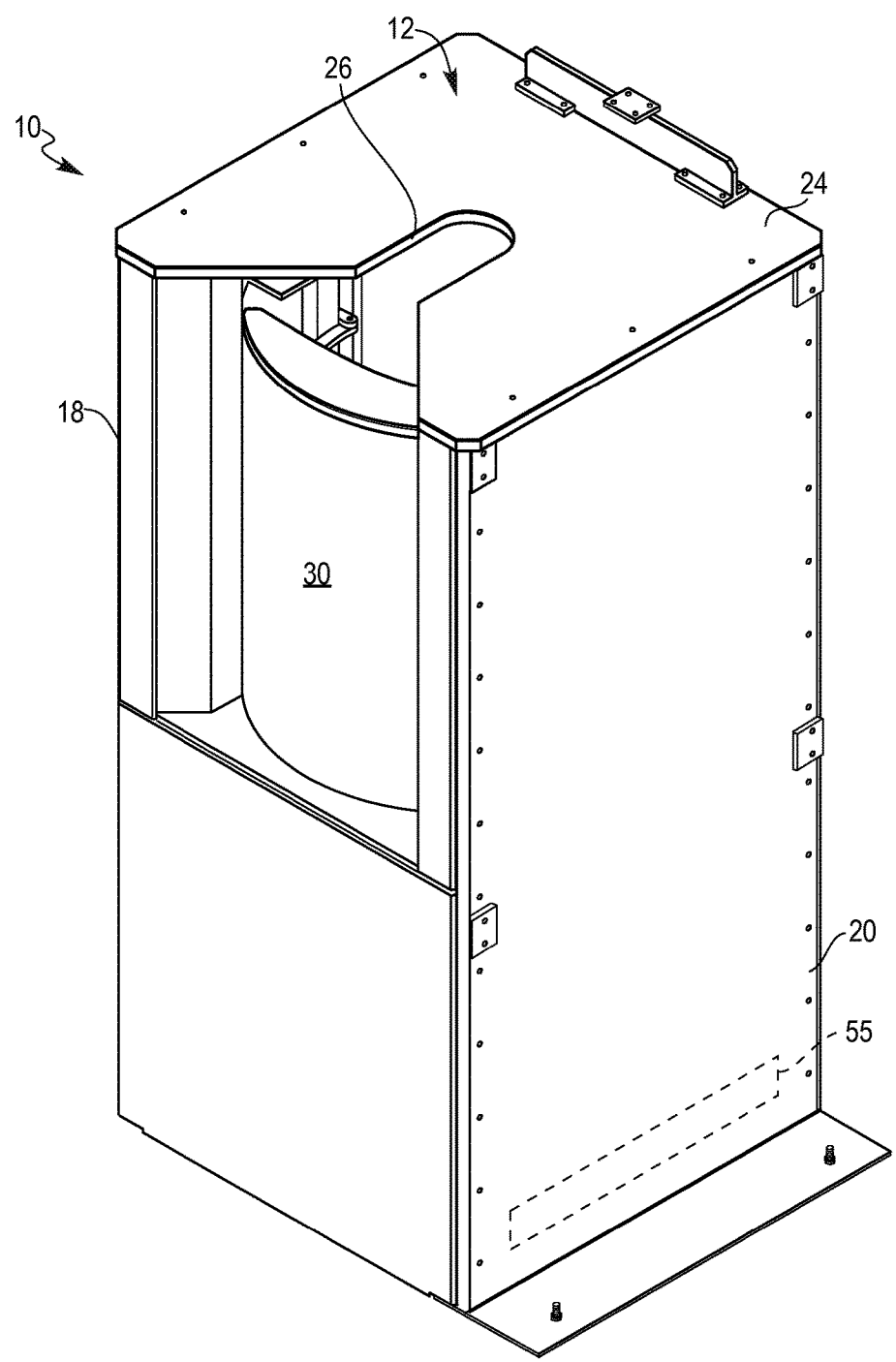
FIG. 3 is a perspective view of the melter of FIG. 1, with a door in a closed position, according to an embodiment described herein.

FIG. 3 is another perspective view of the melter 12 of FIG. 1, in a closed condition. Referring to FIG. 3, the loading chamber 18 of the melter 12 includes a door 30 configured to selectively extend across the opening 22. In one embodiment, the door 30 is a rotary door that is configured to rotate, relative to the interior of the loading chamber 18 between an open position (FIG. 1) and the closed position (FIG. 3). For example, the door 30 may be positioned within the loading chamber 18 (FIG. 4) and move or slide along a path to the closed position, where the door 30 extends across the opening 22. The path may be generally arcuate or circular and extend between the heating element 24 and a wall of the loading chamber 18.

Figure 4:
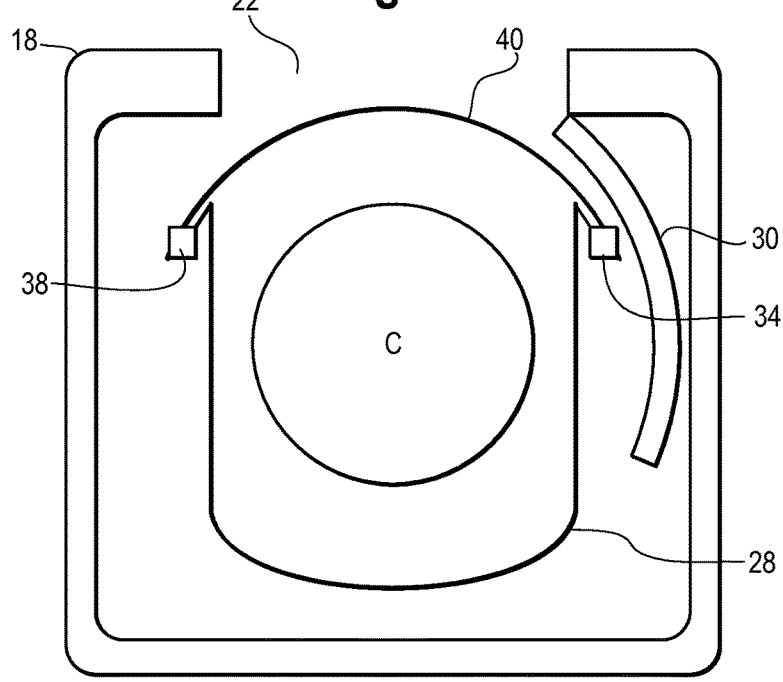
FIG. 4 is a diagram representing a top view of the interior of the loading chamber with the heating element in the receiving position, according to an embodiment described herein.
Figure 5:
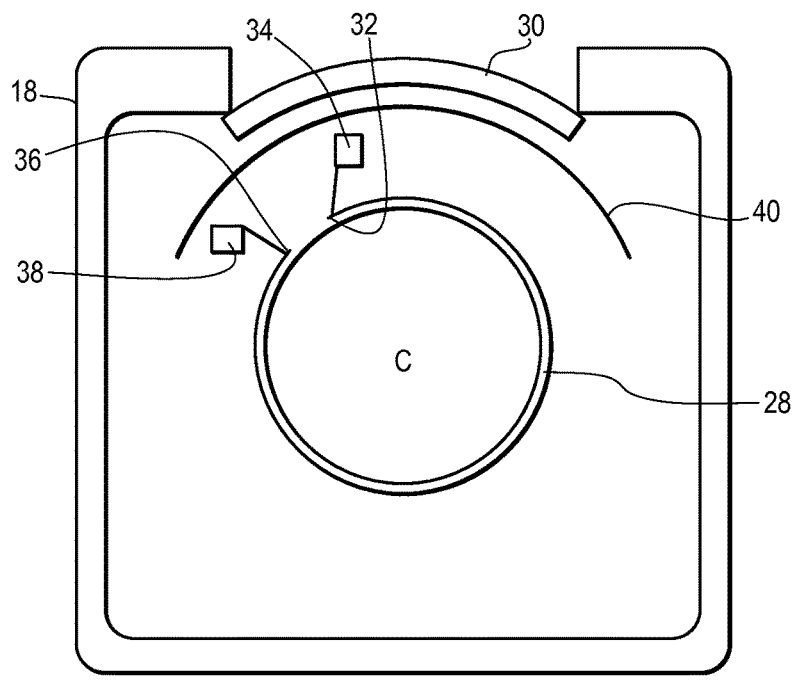
FIG. 5 is a diagram representing a top view of the interior of the loading chamber with the heating element in a closed position, according to an embodiment described herein.

FIGS. 4 and 5 are diagrams showing a top view of an example of the loading chamber 18 with the door 30 moving between the open position (FIG. 4) and the closed position (FIG. 5). Referring to FIGS. 4 and 5, in one embodiment, the heating bands 28 may move between a receiving position configured to receive the container 'C' or drum and a heating position where the heating bands 28 are configured to substantially surround the container 'C'. The heating bands 28 may be movable between the receiving position and the heating position with movement of the door 30 between the open position and the closed position.

Referring to FIG. 4, in the receiving position, the heating bands 28 may be held in a substantially "U" shape, or other similar shape, so that the container 'C' may be received in the loading chamber 18 and between opposing sides of the heating bands 28. The heating bands 28 may be moved to the heating position, as shown in FIG. 5, where they may be held substantially in an "O" shape, such that the heating bands 28 completely or substantially surround the container 'C'. That is, in the heating position, the heating bands 28 are positioned in closer proximity to the container 'C' across a greater surface area of the heating bands 28 than in the receiving position.

In one embodiment, a first end 32 of each heating band 28 may be connected to a first post 34 and a second end 36, opposite to the first end 32, of each heating band 38 may be connected to a second post 38. The first post 34 may be movable with the door 30 during movement of the door 30 from the open position (FIGS. 1 and 4) to the closed position (FIGS. 3 and 5). The first post 34 may be guided along a track 40 or similar guiding mechanism. The second post 38 may remain substantially stationary, or alternatively, may be moved along the track 40 toward the first post 34. In one embodiment, the first post 34 is moved over a longer travel path than the second post 38. In the receiving position, opposite free ends, i.e., first end 32 and second end 36, of the heating bands 28 are spaced apart by a first distance, and in the heating position, the opposite free ends 32, 36 of the heating bands are in contact with other, or spaced apart by a second distance that is less than the first distance.

In operation, according to one example, the first post 34 may travel along a path similar to that of the door 30. Movement of the first post 34, during closing of the door 30, causes the heating bands 28 to move from the receiving position toward the heating position, such that the heating bands are moved to surround or substantially surround the container 'C' and be positioned in closer proximity to the container 'C'. The second post 38 may be moved toward the first post 34 to even out tension in heating bands 28 and balance and center the container 'C' within the heating bands 28. The door 30 and at least one of the first post 34 and second post 38 may be driven by a gear a plate (not shown). The first post 34 and second post 38 may be further controlled by a servo motor (not shown).

FIGS. 6-8 show a lead-in skirt guard 42 that may optionally be secured to the first heating element 28. For example, in the embodiments above where the first heating element 28 is formed as one or more flexible heating bands 28, the skirt guard 42 may be secured to the lowermost heating band 28 to prevent or limit interference between the lower most heating band 28 and a rim 'R' on the container 'C' during movement of the heating bands 28 between the receiving position and the heating position.

FIG. 6 is a rear view of the lead-in skirt guard 42 according to one embodiment. FIG. 7 is a front view of the lead-in skirt guard 42 of FIG. 6. In this embodiment, it is understood that "rear" side refers to a side of the skirt guard configured to face away from the container 'C', and be fastened to the heating band 28, while the "front" side refers to a side that is configured to face, and in some configurations abut, the container 'C' when the container is positioned in the loading chamber 18.

Referring to FIGS. 6 and 7, the skirt guard 42, according to one embodiment, includes a body 44 having one or more fastening arms 46 extending from a first edge and one or more tabs 48 extending from a second edge of the body 44, opposite to the first edge. The body 44 is configured to extend generally circumferentially or in the same direction as a length of the heating band 28. The fastening arms 46 are configured to extend generally in a vertical direction, or transverse to the circumferential or length directions. The one or more tabs 48 are configured to extend generally transverse to the circumferential or length directions, and may be angled relative to the body 44 to extend, for example, in a generally radial direction.

The fastening arms 46 are configured to engage the heating band 28 to position the skirt guard 42 on the heating band 28. In one embodiment, the one or more fastening arms 46 includes an upper hook 50 to extend over an upper edge of the heating band 28 and a lower hook 52 to extend under a lower edge of the heating band 28 so that the skirt guard 42 may be held on the heating band 28. However, in some embodiments, the lower hook 52 is not formed on each fastening arm 46. For example, the lower hook 52 may be included on fastening arms 46 positioned at opposite ends of the body 44, and may be omitted on one or more intermediate fastening arms 46.

The skirt guard 42 may also include one or more zip ties (not shown) extending between an upper hook 50 and an opposing lower hook 52 over a back or rear side, i.e., a side facing away from the container 'C', of the heating band 28. Accordingly, the skirt guard 42 may be secured to the heating band 28 against unintentional removal. In one embodiment, the one or more zip ties may be made from a heat resistant material, such as a stainless steel or similar material capable of withstanding the temperature cycles in the loading chamber 18 of the melter 12.

FIG. 8 is a cross-section showing a portion of the skirt guard 42 relative to the heating band 28 and container 'C'. Referring to FIGS. 6-8, the one or more tabs 48 of the skirt guard 42 extend from the second edge of the body 44, at a non-zero angle θ relative to the body 44. In an embodiment where the skirt guard 42 matches a substantially circular or curved profile of the heating band 28 around a perimeter of the container 'C', the one or more tabs 48 may extend, at least partially, in a radial direction of the circular of curved profile.

In a preferred embodiment, the angle θ formed between the body 44 and each of the one or more tabs 48, at a side facing the heating band 42, is between 45 and 179 degrees. More preferably, the angle θ is between 105 degrees and 115 degrees, but is not limited thereto.

Referring still to FIGS. 6-8, in use, according to one embodiment, the skirt guard 42 may be secured to the lowermost heating band 28 by positioning the upper hook or hooks 50 over an upper edge of the heating band 28 and the lower hook or hooks 52 under a lower edge of the heating band 28. As shown in FIG. 8, the one or tabs 28 are angled rearwardly, i.e, away from the container 'C' at an angle θ. A gap 'G' may exist between a rim 'R' of the container 'C' and the body of the container 'C'. In the event the lowermost heating band 28 nearest the rim 'R' sags during movement between the receiving position and the heating position, the one or more tabs 48 may prevent or limit interference between the heating band 28 and the gap 'G' between the rim 'R' and the body of the container 'C'. For example, the skirt guard 42 may prevent the heating band 28 from entering between or becoming lodged in the gap 'G' on the container 'C'.

The lead-in skirt guard 42 may be formed having a thickness so as to be durable for the desired application, yet flexible with movement of the heating bands 28 between the opened and closed position and still allow sufficient heat transfer between the heating bands 28 and the container 'C' via the skirt guard 42. That is, the skirt guard 42 has heat transfer properties that do not substantially interfere with heat transfer from the lowermost heating band 28 to the container 'C'. Accordingly, the heating band 28 may be heated to approximately the same temperature whether or not skirt guard 42 is attached and still produce sufficient heating of the container 'C' and similar performance results. In one embodiment, the skirt guard 42 may have a thickness of about 0.07 inches to 0.13 inches, and more preferably, about 0.1 inches. However, it is understood that the present disclosure is not limited to this configuration or these dimensions.

Referring again to FIGS. 1-3, the loading chamber 18 and hopper 20 are positioned adjacent to one another. In one embodiment, the loading chamber 18 and hopper 20 are positioned vertically adjacent to one another such that the loading chamber 18 is positioned above of the hopper 20. The loading chamber 18 and hopper 20 are in fluid communication with one another via an aperture 54. The loading chamber 18 and hopper 20 may be formed as a single unit or as separate units secured to one another. The aperture 54 may be formed in a plate positioned between the loading chamber 18 and hopper 20, for example, at a bottom of the loading chamber 18 or at a top of the hopper 20.

The hopper 20 includes a second heating element 55, shown schematically in FIGS. 1 and 3. The second heating element 55 may be, for example, one or more heated plates, bars, baffles or other surfaces within the hopper 20 configured to be heated to a temperature sufficient for melting the hot melt adhesive and maintaining the adhesive in a melted, fluid state. The second heating element 55 may be formed as, for example, a heated manifold.

In operation, according to one example, the container 'C' may be loaded into the loading chamber 18 through the opening 22 with the door 30 in the open position (FIGS. 1 and 4). The container 'C' may then positioned relative to the first heating element 28. The first heating element 28 may be one or more heating bands 28. In one embodiment, the container 'C' is received through an open portion of the "U" shaped first heating element 28 with the first heating element 28 in the receiving position. The door 30 may be moved to the closed position (FIGS. 3 and 5), to substantially enclose the loading chamber 18, with the exception of the slot 26 in the cover 24. The first post 34 and the second post 38 may move the heating bands 28 to a position where the heating bands 28 extend substantially or completely about a perimeter of the container 'C', i.e., the heating position. The heating bands 28 may then be energized or heated, and heat from the heating bands 28, in turn, may heat the container 'C' and the slug of adhesive stored therein. The heat may cause an outer portion of the adhesive to melt, allowing the slug of adhesive to drop from the container 'C', through the aperture 54 and into the hopper 20. A solid portion of the slug of adhesive received in the hopper 20 may then be further melted by the second heating element 55 in the hopper 20 and maintained in the fluid state. In some embodiments, a sensor (not shown) may be positioned in the melter 12 to determine when the slug of adhesive has dropped from the container 'C' into the hopper 20.

The empty container 'C' may be removed from loading chamber 18 and replaced with another container 'C' having a slug of adhesive stored therein. Thus, in the embodiments above, a slug of adhesive may be melted in the hopper 20 while another container of adhesive is positioned in the loading chamber 18. The slug of adhesive may be released into the hopper 20 before the supply of adhesive from the previous container 'C' in the hopper 20 is exhausted. Accordingly, a continuous supply of adhesive may be maintained in the hopper 20 and subsequently supplied to the one or more metering stations and/or fluid application devices (not show).

Figure 9:
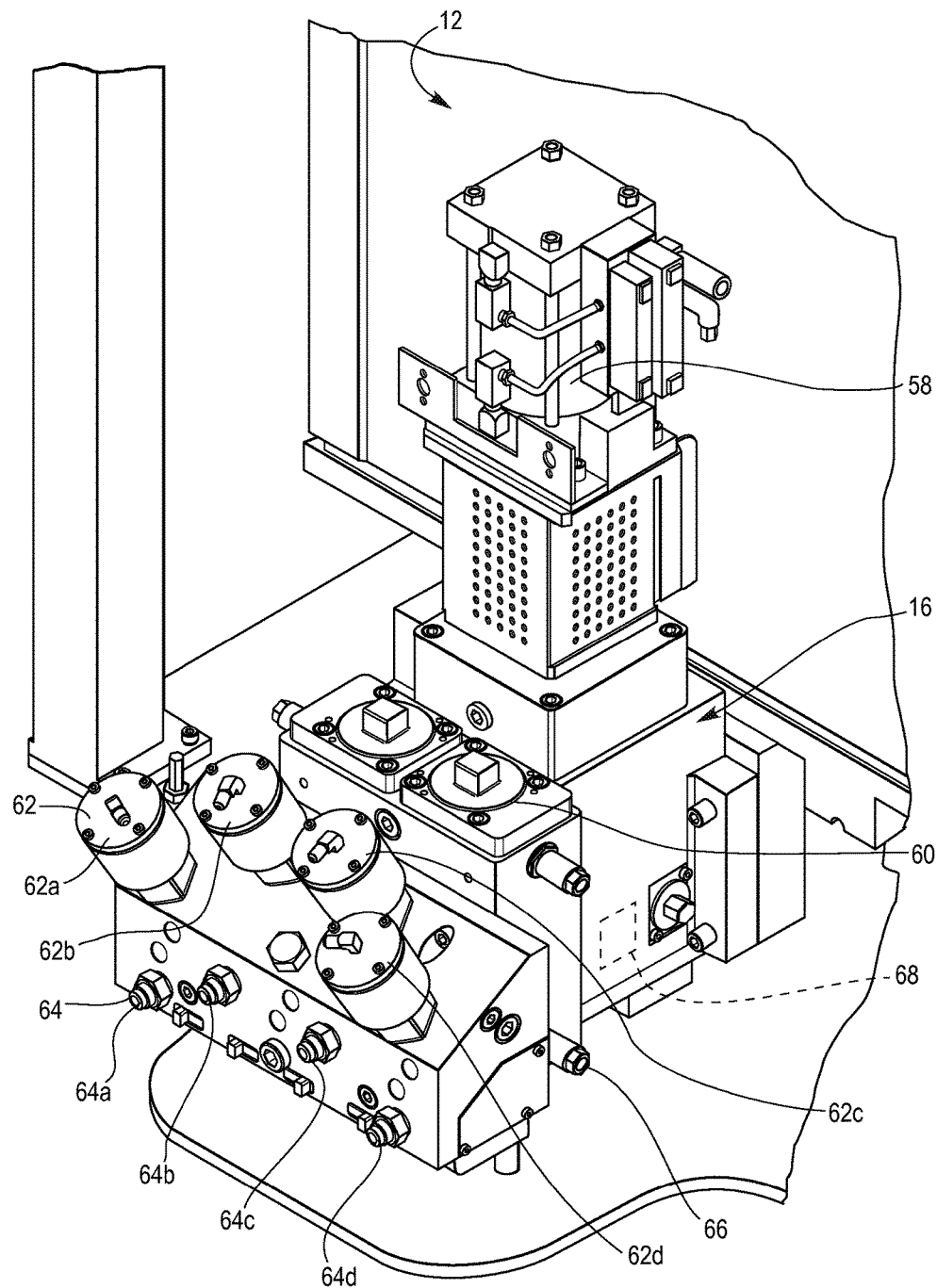
FIG. 9 is a perspective view of a pump assembly of a fluid delivery device according to an embodiment described herein.

Referring to FIG. 9, the melter 12 may further include the pump assembly 16. FIG. 9 is a perspective view of an example of a pump assembly 16 configured to deliver fluid from the melter 12 to the fluid application device (not shown) and/or a metering station at, or upstream from, the fluid application device. The pump assembly 16 may implemented as part of the fluid delivery device 10 and/or part of the melter 12. Alternatively, the pump assembly 16 may be formed separately from the melter 12 and arranged in fluid communication therewith, so as to receive the melted adhesive from the hopper 20.

Referring to FIG. 9, the pump assembly 16 includes a pump 58. In one embodiment, the pump is a piston pump. However, it is understood that other suitable pumps may also be used in addition to, or in place of the piston pump, such as, but not limited to, a gear pump, or the like. It is also understood that the pump assembly 16 may include more than one pump 58.

The pump assembly 16 may also include a filter assembly 60. The filter assembly 60 may be positioned in a flow path of the fluid, e.g., the hot melt adhesive, to filter the fluid flowing through the path. The filter assembly 60 may include, for example, one or more high volume filters.

The pump assembly 16 may also include one or more output ports 62 for outputting or dispensing the fluid, i.e., the melted adhesive, from the pump assembly 16 to the one or more fluid application devices (not shown) and/or metering stations (not shown). In one embodiment, each output port 62 may discharge the fluid to a different metering station or fluid application device. That is, each output port 62 may be associated with a different metering station or fluid application device. For example, in the embodiment shown in FIG. 9, the pump assembly 16 may include four output ports 62. The pump assembly 16 may be fluidically connected with four different metering stations or fluid application devices, and each output port 62 may discharge the fluid to a respective metering station or fluid application device to which each port is fluidically connected.

The one or more output ports 62 may be hose outputs. The hose outputs 62 may project outwardly from the pump assembly 16 and are configured for attachment of a hose thereto to direct the fluid to the fluid application device. It is understood that the present disclosure is not limited to four output ports, and that the pump assembly 16 may include either less or more output ports 62 as necessary. For example, the pump assembly may include anywhere from one to ten output ports 62, or more, where desired, for a particular application. In addition, it is understood that each output port 62 may discharge the fluid to one or more fluid application devices and/or metering stations at, or upstream from, the one or more fluid application devices.

Referring still to FIG. 9, the pump assembly may further include one or more pressure regulator valves (PRV) 64 to regulate or control the flow, and in particular the pressure, of the fluid, i.e., the melted adhesive, output from the pump assembly 16 to the at least one fluid application device or metering station. In one embodiment, the each of the one or more PRVs 64 is disposed upstream from a respective output port 62. However, it is understood that in other embodiments, the PRVs 64 may be positioned downstream from respective output ports 62.

In one embodiment, the one or more PRVs 64 may control pressure of the fluid delivered to individual or multiple fluid application devices, metering stations or metering applicators. In other configurations, more than one PRV 64 may be provided to control flow to one or more metering stations or fluid application devices. That is, each PRV 64 may be associated with a respective fluid application device or metering station, and in some configurations, to a metering station or metering applicator at or upstream from each fluid application device. Thus, the fluid delivery device 10 may deliver a controlled output of fluid to multiple fluid application devices and/or metering stations, and the delivery of fluid to each fluid application device and/or metering station may be individually metered or controlled by a respective PRV 64 of the pump assembly 16. In one example, the PRVs 64 are used when the system has a pump 58 delivering the fluid to one or multiple metering stations or fluid application devices.

In one embodiment, with further reference to FIG. 9, the one or more PRVs 64 may include a first PRV 64a, a second PRV 64b, a third PRV 64c and a fourth PRV 64d. Each PRV 64a-d is associated with a respective output port 62a, 62b, 62c, 62d through which fluid is output to a respective metering station and/or fluid application device. In this example, the first PRV 64a may control the flow, e.g., pressure, of the fluid to be output through the first output port 62a and to a first metering station and/or fluid application device, the second PRV 64b may control the flow of the fluid to be output through the second output port 62b and to a second metering station and/or fluid application device, the third PRV 64c may control the flow of the fluid to be output through the third output port 62c and to a third metering station and/or fluid application device, and the fourth PRV 64d may control the flow of the fluid to be output through the fourth output port 62d and to a fourth metering station and/or fluid application device. The PRVs 64a-d may increase or decrease the pressure, or stop the flow of the fluid discharged through respective output ports 62a-d.

The pump assembly 16 may also include one or more pressure bleed valves 66. The pressure bleed valves 66 may act to relieve excess pressure from within the pump assembly 16.

It is understood that the PRVs 64a-d and output ports 62a-d are described for the purposes of example only, and the present invention is not limited to this arrangement. For example, additional or fewer PRVs 64 and/or outputs 62 may be provided. In some embodiments, the pump assembly 16 may include a single pump to control pressure to individual metering units. In other embodiments, the pump assembly 16 may include multiple pumps, each independently feeding an applicator or metering unit.

Further, in other embodiments, the PRVs 64 may be omitted. That is, in some embodiments, the pump or pumps 58 of the pump assembly 16 may directly control delivery of the fluid to the one or more fluid application devices or metering devices at or upstream from the one or more fluid application devices. Thus, the pump 58 may be operated and controlled to achieve a desired output of fluid from the fluid delivery device 10. For example, in some embodiments, the pump or pumps 58 may be controlled to regulate the pressure of the fluid.

Thus, in the embodiments above, the pump assembly 16 may deliver the fluid, i.e., the melted adhesive, from the hopper 20 to one or more metering stations, metering applicators and/or fluid application devices. In some configurations, the one or more metering stations or metering applicators may be positioned at respective fluid application devices, or upstream therefrom. The pump assembly 16 includes a pump 58. The pump 58 may be a piston pump or a gear pump. The pump 58 is configured to discharge the fluid through one or more output ports 62, each output port 62 configured to deliver the fluid to a respective metering station, metering applicator or fluid application device. The pump assembly 16 may include one or more PRV 64. Each PRV 64 may be disposed in relation to a respective output port 62 so as to control a pressure of the fluid discharged from the output port 62. Accordingly, the pressure of a fluid delivered to one or more metering stations, metering applicators or fluid application devices may be individually and independently controlled by a PRV 64 at a respective output port 62. As such, the fluid may be delivered simultaneously to different metering stations, metering applicators or fluid application devices, at independently and individually controlled pressures for each metering station, metering application or fluid application device, based on operation of a PRV 62 controlling the pressure of the fluid delivered to the respective metering station, metering applicator or fluid application device.

Alternatively, the one or more PRVs 64 may be omitted, and the pump assembly 16 may include one or more pumps 58. Each pump 58 may discharge the fluid through one or more output ports 62, with each output port 62 configured to deliver the fluid to a respective metering station, metering applicator or fluid application device. Each pump 58 may be independently and individually controlled to discharge the fluid to one or more output ports 62 fluidically connected with a respective pump 58 at an independent and individually controlled pressure. Accordingly, the fluid may be delivered to one or more metering stations, metering applicators or fluid application devices simultaneously at independently and individually controlled pressures based on independent and individual operation of a respective pump 58 that is in fluid communication with the metering station, metering applicator or fluid application device. It is further understood that in the embodiments above, a PRV 64 or a pump 58 may be operated to stop flow of the fluid to a metering station, metering applicator or fluid application device. The pump assembly 16 may feed fluid to, for example, one to twenty metering stations, metering applicators or fluid application devices, or more, as necessary. Each metering station, metering applicator or fluid application device may be positioned remotely from the fluid delivery device 10.

The fluid delivery device 10 may further include a controller 68. The controller 68 may be operatively and communicably connected to, among other elements, the PRVs 64, so as to control the PRVs 64. The controller 68 may include, for example, an input/output (I/O) unit configured to send and/or receive data to/from an external device, a memory unit configured to store data, a receiving unit and a sending unit. It is understood that the various features of the controller 68 described above are operably and communicably connected to one another. It is further understood that these devices, while described as being part of the controller 68, may be separate from the controller 68 and operably and communicably connected thereto.

The controller 68 may be implemented as a microprocessor or computer having a microprocessor configured to execute program instructions stored in one or more computer-readable storage media, such as, but not limited to, the memory unit. Computer-readable storage media include non-transitory media, for example, magnetic media, including hard disks and floppy disks; optical media including CD ROM disks and DVDs, and/or optical disks. Computer-readable storage media may also include hardware devices configured to store and/or perform program instructions, including read-only memory (ROM), random access memory (RAM), flash memory and the like. It is understood that non-transitory media does not include signals or waves.

In one embodiment, the controller 68 may be operably and communicably connected to the one or more PRVs 64. The controller 68 may configured to independently control each PRV 64. For example, referring to the configuration shown in FIG. 9, the controller 68 may control each PRV 64*a-d* individually and independent of one another. Accordingly, the pressure of a fluid flowing through the PRVs 64*a-d*, and through respective outputs 62*a-d* and to respective fluid application devices and/or metering stations may be controlled so that the fluid dispensing devices may be used for different applications, based on varying fluid pressures, while receiving the fluid supply from a single source, i.e., the fluid delivery device 10. That is, the pressure of the fluid output to the respective fluid application devices may be independently and individually controlled such that the different fluid application devices or metering stations receive fluid at individually tuned pressures. In one example, fluid maybe output at differently tuned pressures to each fluid application device or metering station based on control of the PRVs 64*a-d* by the controller 68. It is understood however that the desired pressure of fluid may be the same across some or all of the PRVs 64*a-d* and is not limited to the examples above. A plurality of sensors (not shown) may be included to measure or detect the pressure of the fluid at predetermined points. The sensors may be in communication with the controller 68 which may then, in turn, operate or control the one or more PRVs based on, or in response to, the measured or detected data received from the sensors.

Figure 10:
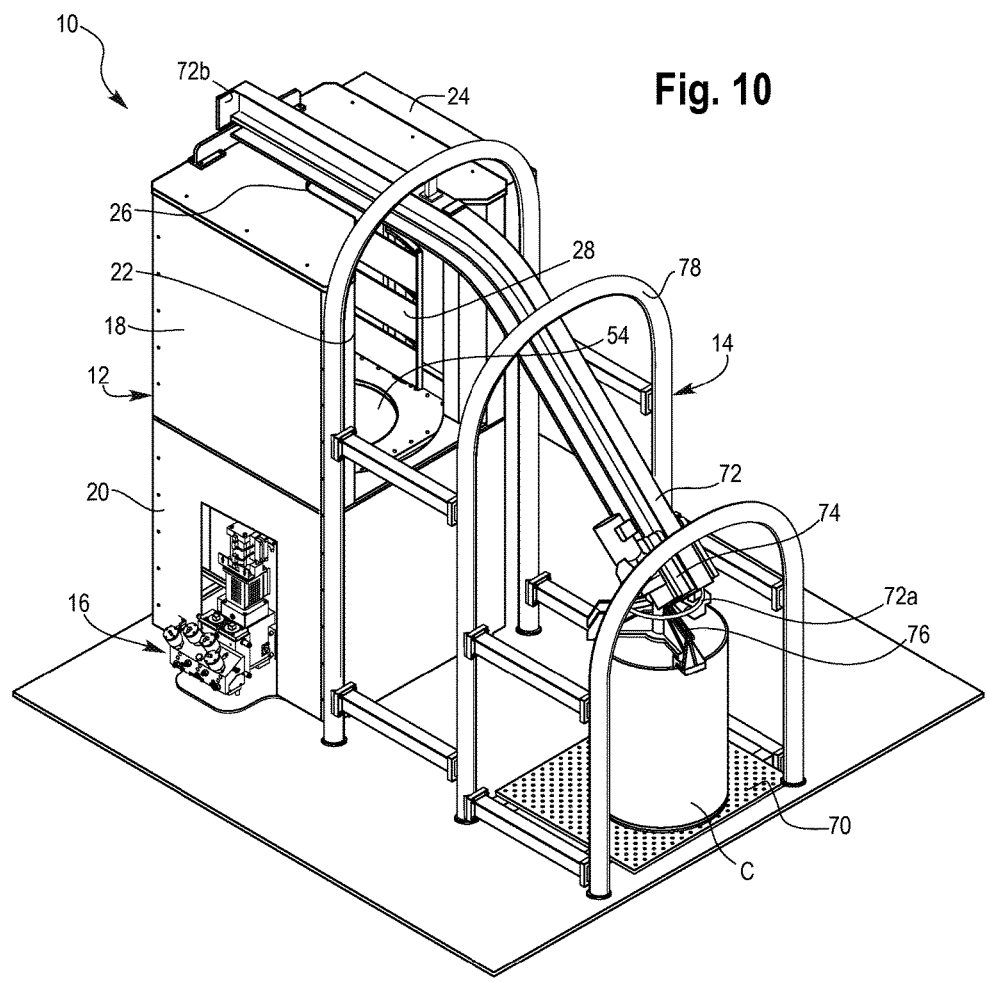
FIG. 10 is a perspective view of a fluid delivery device including a container handling system according to an embodiment described herein.

FIG. 10 is a perspective view of the fluid delivery device 10 and the container handling system 14, according to one embodiment. Referring to FIG. 10, the container handling system 14 may optionally include a loading platform 70 positioned remotely from the melter 12 for initial positioning of the container 'C'. The loading platform 70 may be formed with, for example, slots, grooves and/or baffles to decrease a surface area in contact with the container 'C'. The loading platform 70 may also be made from a low friction or non-stick material, such as polytetrafluorethylene (PTFE) or other similar material. The loading platform 70 may include positioning features for positioning of the container 'C' thereon. For example, the loading platform 70 may include a substantially cylindrical recess corresponding to a diameter of the container 'C' configured to receive the container 'C' therein. Alternatively, or in addition, the loading platform 70 may include one or more upstanding positive stops. The upstanding stops may be arranged substantially in a 'V" shape to guide the container 'C' to a proper position on the loading platform 70.

In one embodiment, the container handling system 14 also includes a rail 72 extending from a first position remote from the melter 12, for example, above the loading platform 70, to a second position above the melter 12. A trolley 74 is slidably or rollingly positioned on the rail 72 and is configured to move along the rail 72 from the first position to the second position. The trolley 74 is releasably securable to the container 'C', for example, with a chuck 76. The rail 72 may include positive stops 72*a*, 72*b* at opposite ends thereof.

The container handling system 14 may also include a support structure 78. The support structure 78 may include one or more support brackets secured, directly or indirectly, to the rail 72. The support structure 78 may also be secured to and support the loading platform 70.

The rail 72 may include an inclined segment between the first and second positions. The trolley 74 is configured to move along the rail 72, up the inclined segment, to the second position above the melter 12. The trolley 74 may be powered by a motor (not shown) or an external driving mechanism, for example. Other similar, suitable devices may be used to drive the trolley 74 along the rail 72. Accordingly, with the chuck 76 secured to the container 'C', movement of the trolley 74 along the rail 72 lifts the container from the loading platform 70 to an elevated position to be received through the opening 22 of the loading chamber 18 and into the interior of the loading chamber. A portion of the trolley 74 or the chuck 76 may extend through the slot 26 formed in the cover 24 of the loading chamber 18. The container 'C' may be unloaded from the melter 12 by driving the trolley 72 in an opposite direction, i.e., toward the first position, so as to move the container 'C' outwardly through the opening 22 and returning the container 'C' to the loading platform 70.

Figure 11:
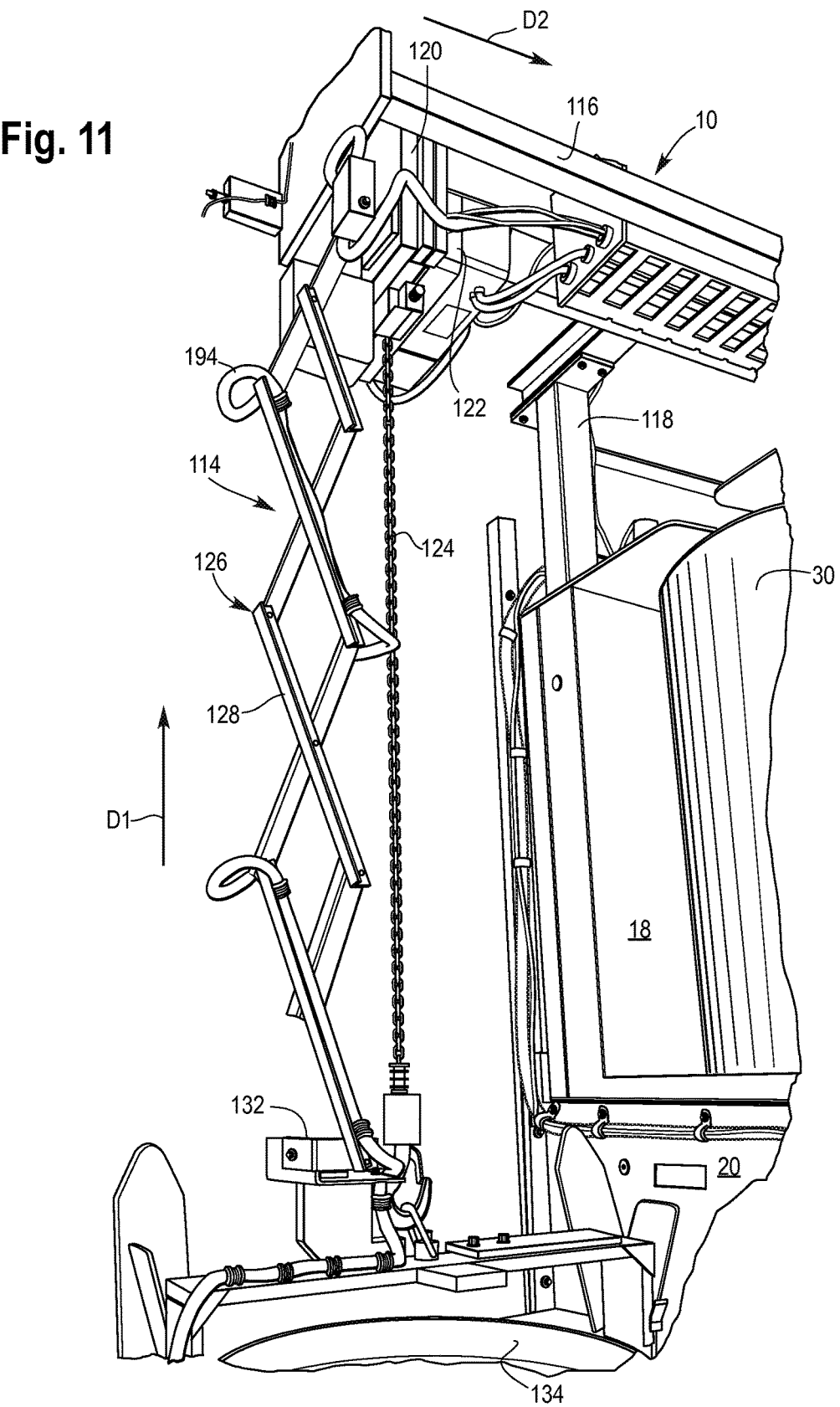
FIG. 11 is a perspective view of a container handling system of a fluid delivery device according to another embodiment described herein.

FIG. 11 is a perspective view of the container handling system 114 according to another embodiment described herein. The container handling system 114 is configured to releasably engage the container 'C', lift the container 'C' in a first direction 'D1' to a predetermined height suitable for loading into the loading chamber 18 of the melter 12, and move the container 'C' in a second direction 'D2' from a position remote from the melter 12 to a position within the loading chamber 18 of the melter 12.

Referring to FIG. 11, in one embodiment, the container handling system 114 includes a rail 116 extending from a first position remote from the melter 12 to a second position above the melter 12. In one example, the rail 116 may extend in a substantially level, horizontal direction. The rail 116 may be supported by a support structure 118. In one embodiment, the support structure is mounted on the melter 12. In another embodiment, the support structure 118 may be self-supported and separate from the melter 12. That is, the support structure 118, in some embodiments, may be independent from the melter 12.

A trolley 120 is coupled to the rail 116 and configured for sliding or rolling movement along the rail 116 to move the container 'C' from a position remote from the melter 12 to a position within the loading chamber 18. The trolley 120 may be motor driven and/or manually driven along the rail 116. The motor may be positioned at the trolley 120 and may be movable with the trolley. Alternatively, the motor may be positioned remote from the trolley 120 and be configured to drive the trolley 120 along the rail 116 using known mechanisms to output power from the motor to the trolley 120, such as a chain drive. A bellows may be positioned along the rail 116 to house various components.

The container handling system 114 further includes a lifting mechanism 122. The lifting mechanism is configured to lift the container 'C' in the first direction, for example, vertically, to a height where the container 'C' may be placed in the loading chamber 18 of the melter 12. In one embodiment, the lifting mechanism 122 may be implemented as an electric hoist, winch or similar mechanism. For example, the hoist may be coupled to or formed integrally with the trolley 120. For example, the trolley 120 and the lifting mechanism 122 may be implemented as a motorized electric hoist, where the motor, trolley 120 and hoist 122 are implemented as a unit for movement along the rail 116. A flexible member 124, such as a cable or chain may retractably extend from the hoist and be coupled to the container 'C' as described further below.

Figure 12:
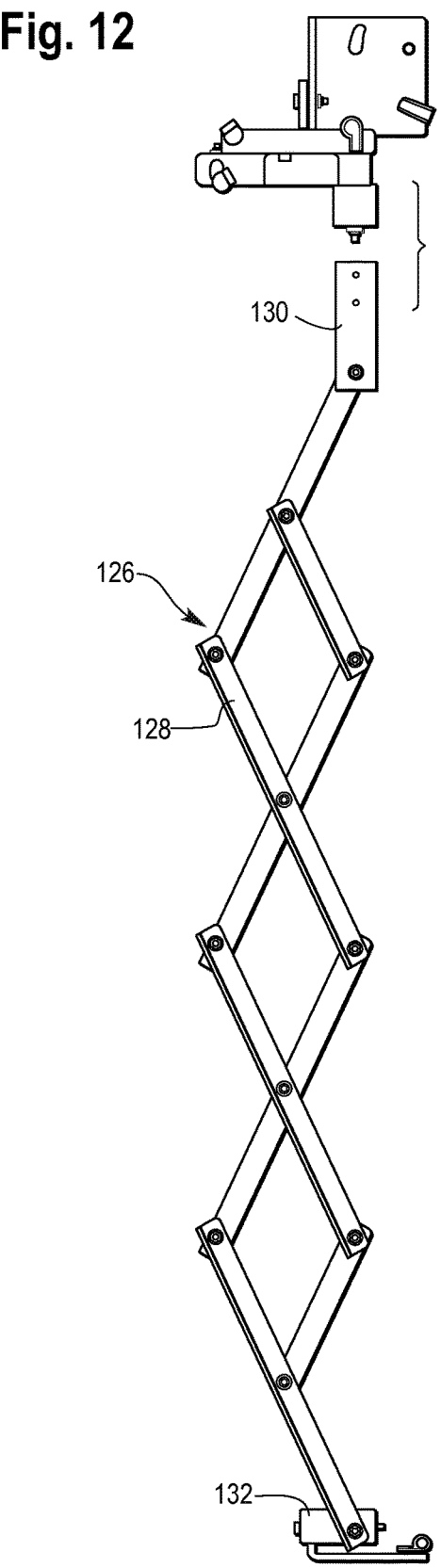
FIG. 12 is a side view of a stabilizing linkage according to an embodiment described herein.

With further reference to FIG. 11, the container handling system 114 may further include a stabilizing linkage 126. FIG. 12 is a side view of the stabilizing linkage 126, according to an embodiment described herein. Referring to FIGS. 11 and 12, the stabilizing linkage 126 has a first end that is configured for connection to the trolley 120 and a second end that is configured for connection to the container 'C'. In one embodiment, the stabilizing linkage 126 is includes a scissor-type linkage 128 that may is extendable and retractable in a direction in which the container 'C' is lifted and lowered. It is understood, however, that the stabilizing linkage 126 is not limited to this example, and may be, for example, one or more telescoping rods, plates or brackets.

The stabilizing linkage 126 may be connected to the trolley 120 via a first coupling piece 130. The first coupling piece 130 may be formed as a connector block having one end secured to the scissor-type linkage 128 and another end secured to the trolley 120 using, for example, bolts or similar known fastening devices. The connector block 130 may be made from an elastomeric or similar resilient material, including rubber, having shock absorbing properties to absorb for example, torsional and axial forces to resist twisting and reduce axial forces transmitted along the stabilizing linkage 126.

Figure 13:
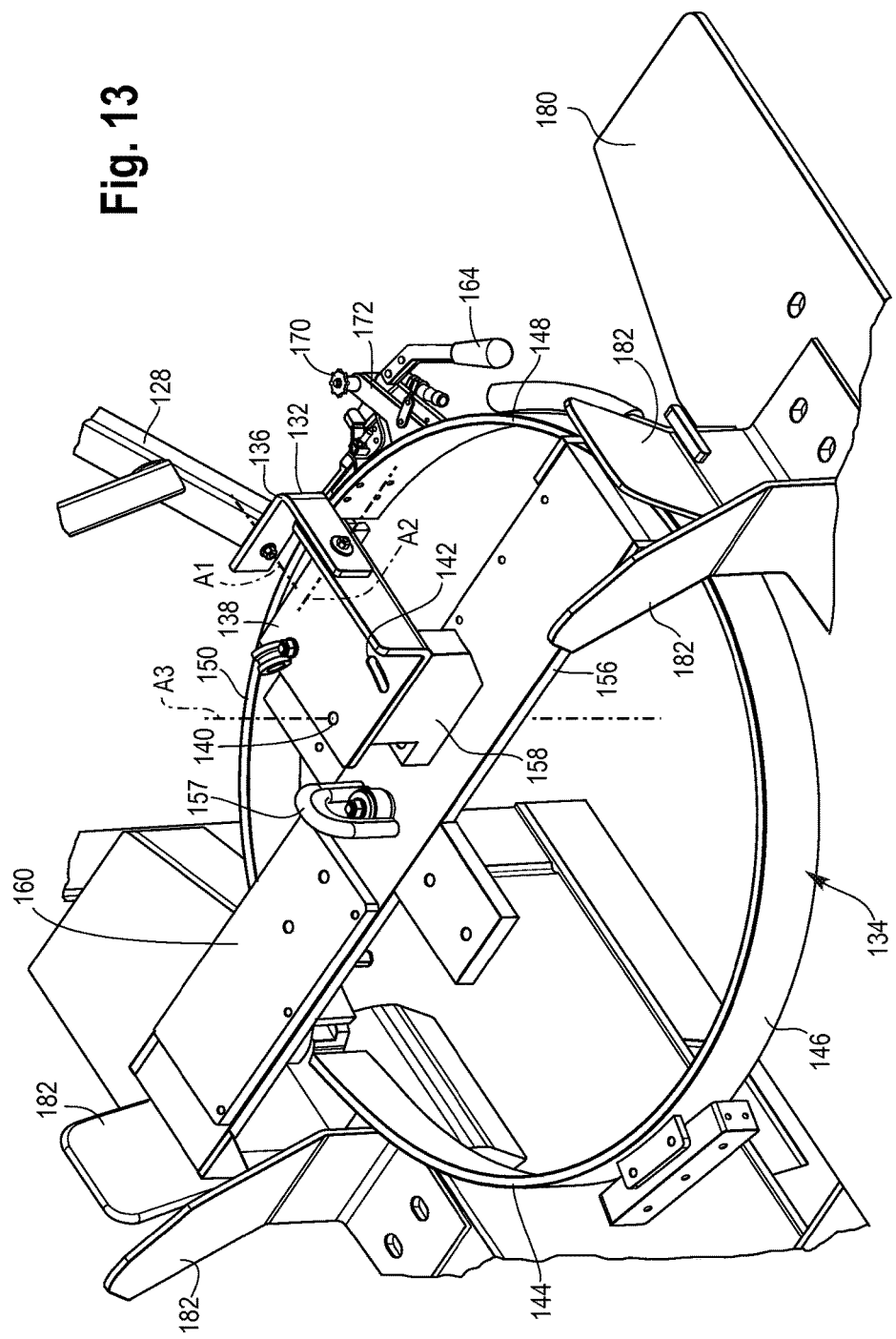
FIG. 13 is a perspective view of a portion of the stabilizing linkage of FIG. 12 and a chuck, according to an embodiment described herein.

Referring again to FIG. 11, the stabilizing linkage 126, at another end, opposite to the first coupling piece 130, may include a second coupling piece 132 for coupling the stabilizing linkage to a chuck 134. FIG. 13 is a perspective view showing a portion of the stabilizing linkage 126 connected to the chuck 134 via the second coupling piece 132.

Referring to FIGS. 11-13, in one embodiment, the second coupling piece 132 is configured to allow for freedom of rotational movement about two axes through predetermined ranges. To this end, in one embodiment, the second coupling piece 132 includes an L-shaped bracket 136 and an L-shaped plate 138. The L-shaped bracket 136 is secured to the scissor-type linkage 128 and may be rotatable relative to the scissor-type linkage 136 on a first axis 'A1'. In one embodiment, the first axis 'A1' extends through a fastener securing the L-shaped bracket 136 to the scissor-type linkage 128. The L-shaped plate 138 is secured to the L-shaped bracket 136 and may be rotatable relative to the L-shaped bracket 136 on a second axis 'A2'. In one embodiment, the second axis 'A2' extends through a fastener securing the L-shaped plate 138 to the L-shaped bracket 136.

The first axis 'A1' and the second axis 'A2' extend so as to intersect each other. Rotational degrees of freedom are provided about the first axis 'A1' and the second axis 'A2' to allow for flexibility in an otherwise rigid connection at the second coupling piece 132. Accordingly, external forces applied or transferred to the second coupling piece may be absorbed, at least in part, through rotation about the first and second axes 'A1', 'A2'. That is, the stabilizing linkage 126 may absorb some external forces through deflection of various components, for example, at the second coupling piece 132, for added durability relative to a rigid configuration.

Referring further to FIG. 13, the L-shaped plate 138 may be secured to the chuck 134. In one embodiment, the L-shaped plate 138 includes a fastening hole 140 configured to receive a first fastener (not shown) for coupling to the chuck 134. The L-shaped plate 138 may further include an arcuate slot 142 configured to receive a second fastener (not shown) also coupled to the chuck 134. In use, according to one example, the arcuate slot 142 allows for rotation of the chuck 134 about a third axis 'A3' extending through the fastening hole 140 relative to the L-shaped plate 138, or vice versa, for adjustment and positioning of chuck 134 relative to the container 'C'. The rotation about the third axis 'A3' is limited to an acceptable predetermined degree corresponding to a length of the arcuate slot 142.

Figure 14:
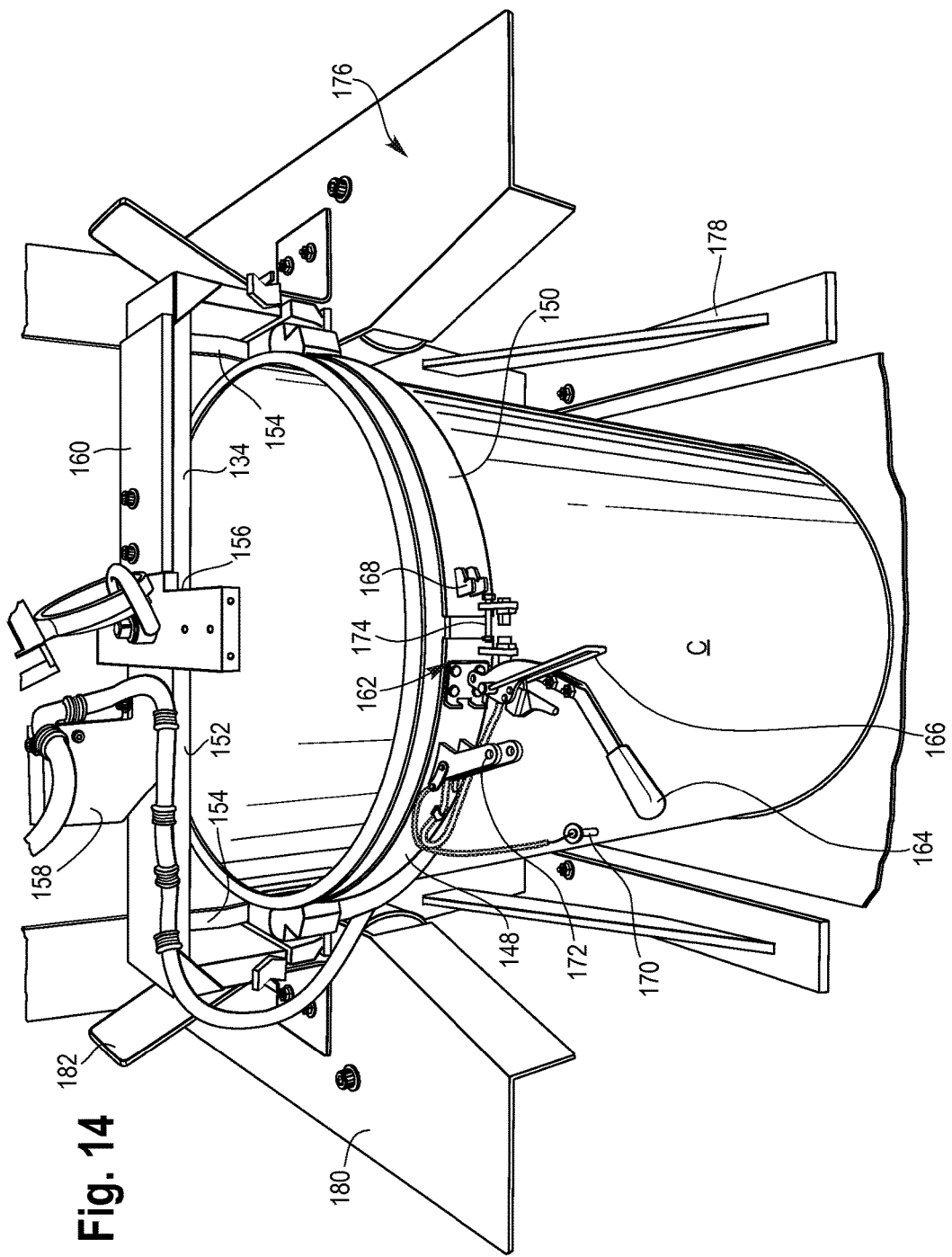
FIG. 14 is a front perspective view of the chuck of FIG. 13 holding a container therein, according to an embodiment described herein.
Figure 15:
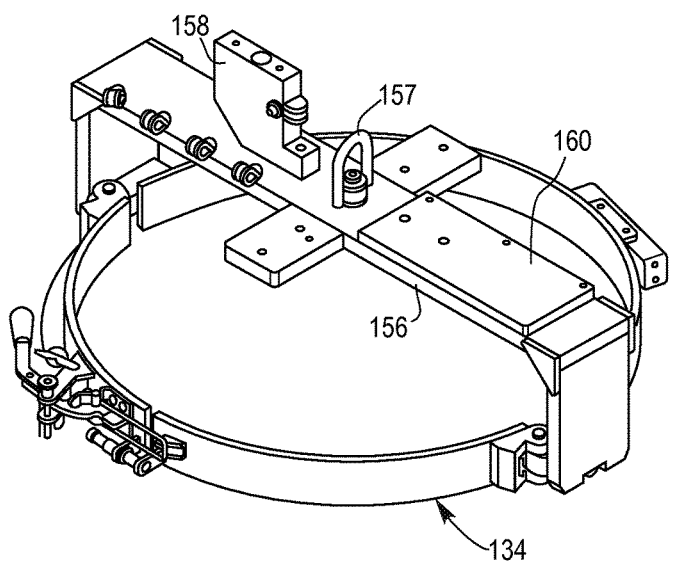
FIG. 15 is a perspective view of the chuck of FIG. 13 in a first configuration, according to an embodiment described herein.
Figure 16:
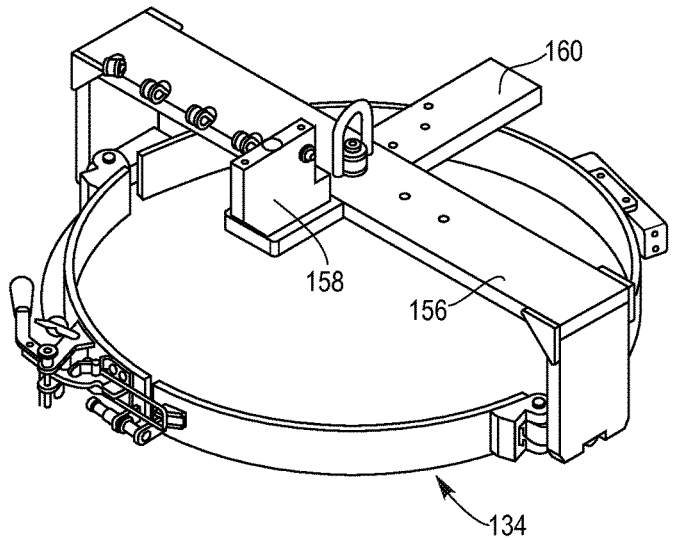
FIG. 16 is a perspective view of the chuck of FIG. 13 in a second configuration, according to an embodiment described herein.
Figure 17:
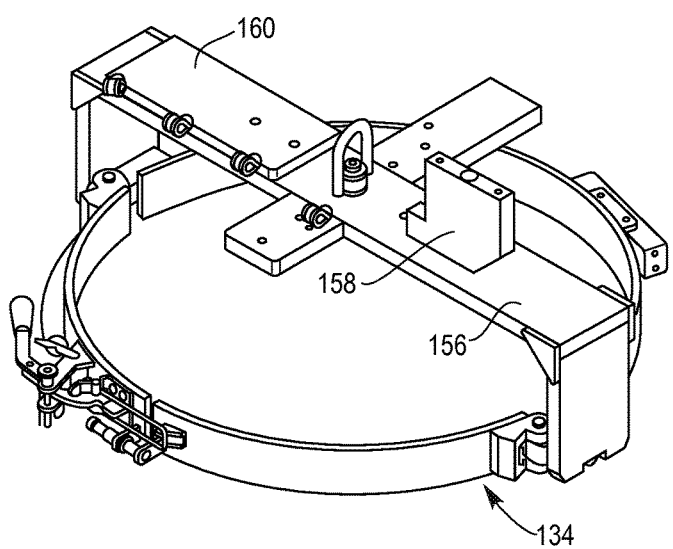
FIG. 17 is a perspective view of the chuck of FIG. 13 in a third configuration, according to an embodiment described herein.

FIG. 14 is a front perspective view of the chuck 134 having the container 'C' held therein. FIGS. 15-17 are perspective views of the chuck 134 secured to the stabilizing linkage 126 and lifting mechanism 122 in different configurations. Referring to FIGS. 13-17, in one embodiment, the chuck 134 includes a clamping band 144 configured to be secured around and apply a clamping force to the container 'C'. In one embodiment, the clamping band 144 includes a guide band 146, a first arm 148 and a second arm 150. The chuck 134 further includes a support bracket 152, the support bracket having a pair of braces 154 connected to the clamping band 144 and a crossbar 156 extending between the braces 154. The first arm 148 and the second arm 150 are rotatably secured to respective braces 154 or the guide band 146. The first arm 148 and second arm 150 may be held in an open position with respective magnetic latches (now shown). In one embodiment, a lug 157 is formed on the crossbar 156 for coupling with the lifting mechanism 122. For example, the flexible member 124 may include a hook or latch on a distal end thereof that couples with the lug 157. Alternatively, the flexible member 124 may be secured to the crossbar 156 with a bolt. Other known coupling mechanisms may be used as well.

A linkage bracket 158 and a linkage counterweight 160 are positioned on and secured to the crossbar 156. The linkage bracket 276 is configured to be secured to the L-shaped plate 138 of the second coupling piece 132, to thereby secure the stabilizing linkage 126 to the chuck 134. In one embodiment, the linkage bracket 158 and linkage counterweight 160 are rotatably secured to the crossbar 156 and maintain a fixed position relative to the melter 12 when the chuck 134 is rotated between a first configuration, second configuration and third configuration as shown in FIGS. 15-17. Alternatively, the linkage bracket 158 and linkage counterweight are selectively securable to the crossbar 156 so as to be repositionable on the crossbar 156, with, for example, screws or bolts received in corresponding fastening holes. It is understood that the linkage bracket 158 and counterweight 160 need not be aligned along, or transverse to the crossbar 156. That is, the linkage bracket 158 and counterweight 160 may be offset from one another along the cross bar 156. In one example, the linkage bracket 158 may be positioned to extend transversely relative to the crossbar 156, for example, as shown in FIG. 16. However, the counterweight 160 may be positioned at a different location along the length of the crossbar 156, i.e., different from the position shown in FIG. 16, such that the counterweight 160 is offset from the linkage bracket 158. The counterweight 160 may be secured to the crossbar 156 using suitable fasteners, such as a bolts or screws, extending through corresponding fastening holes formed in the counterweight 160 and crossbar 156.

Referring further to FIGS. 13-17, and in particular to FIG. 14, the chuck 134 is configured to selectively apply a clamping force on the container 'C' to secure the container 'C' therein. To this end, the chuck 134 may further include a clamping mechanism 162. The clamping mechanism 162 is configured to apply or release a force to the first arm 148 and second arm 150 such that the first arm 148 and second arm 150 may apply or release a clamping force to the container 'C'. The clamping mechanism 162 includes a handle 164 pivotably mounted to one of the first arm 148 and the second arm 150, a latch 166 eccentrically and pivotably mounted to the handle 164 and a catch 168 mounted on the other of the first arm 148 and second arm 150. In use, the latch 166 may be pivoted to engage the catch 168. The handle 164 may be rotated so that the latch 166 applies a force on the catch 168 which draws the first arm 148 and second arm 158 toward one another, thereby applying the clamping force to the container 'C'. The handle 164 may be secured in place, in a clamped position, with a pin 170 extending through a bracket 172.

The clamping mechanism 162 may further include a positive stop 174 extending between the first arm 148 and the second arm 150. The positive stop 174 may be secured on one of the first arm 148 and second arm 150 and be brought into contact with a flange on the other of the first arm 148 and second arm 150 during clamping (i.e., during rotation of the handle 164 to apply a force on the catch 168 via the latch 166). Accordingly, the positive stop 174 may limit a clamping force applied to the container 'C'.

With further reference to FIG. 14, the fluid delivery device 10 may also include a cradle 176 configured to guide and hold the chuck 134 in a position where the container 'C' may be secured therein. In one embodiment, the cradle 176 includes a base 178 and a guiding section 180 extending from the base 178. In one embodiment, the guiding section 180 is formed as a generally U-shaped section configured to receive the container 'C'. The guiding section 180 may include a plurality of angled tabs 182 extending therefrom. The plurality of angled tabs 182 are configured to receive chuck 134 and guide the chuck 134 to a position where it may be secured to the container 'C'.

It is understood that the container handling system is not limited to the embodiments described above. For example, in another embodiment, the container handling system may be implemented as a hydraulic parallel linkage (not shown) mounted to each side of a chuck (not shown) configured to be secured to the container 'C', and linked together. The hydraulic parallel linkage may include, for example, a linkage assembly (not shown) having one more linkage arms (not shown) pivotably or rotationally secured on two opposite sides of the melter 12, and a hydraulic ram (not shown) pivotably or rotationally mounted on each of the two opposite sides coupled to the linkage assembly. The hydraulic rams are configured to drive the linkage assembly to move between a lowered position where the container 'C' may be positioned and secured in the chuck and a raised position wherein the container 'C' is lifted and moved into the loading chamber 18. The hydraulic rams may be coupled to the linkage assembly at a location spaced from a pivot or rotation axis of the linkage assembly so that the hydraulic rams may drive the linkage assembly to rotate from the lowered position to the raised position. The hydraulic rams may be formed in a piston-cylinder configuration (not shown) where the piston is slidable relative to the cylinder between a retracted position and an extended position in response to a hydraulic load being applied thereto or removed therefrom. In one embodiment, the linkage assembly is rotated through approximately ninety degrees when moved from the lowered position to the raised position and vice versa.

Figure 18:
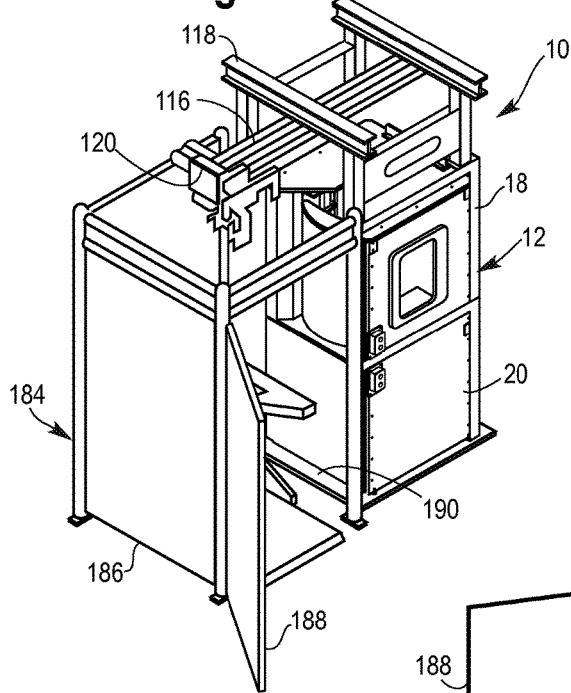
FIG. 18 is a perspective view of a fluid delivery device having an access area in a right hand configuration, according to an embodiment described herein.
Figure 19:
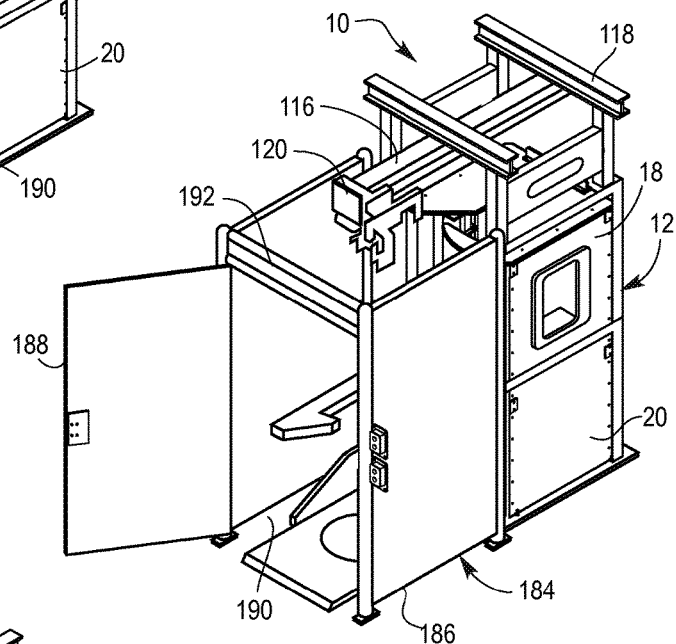
FIG. 19 is a perspective view of a fluid delivery device having an access area in a front configuration, according to an embodiment described herein.
Figure 20:
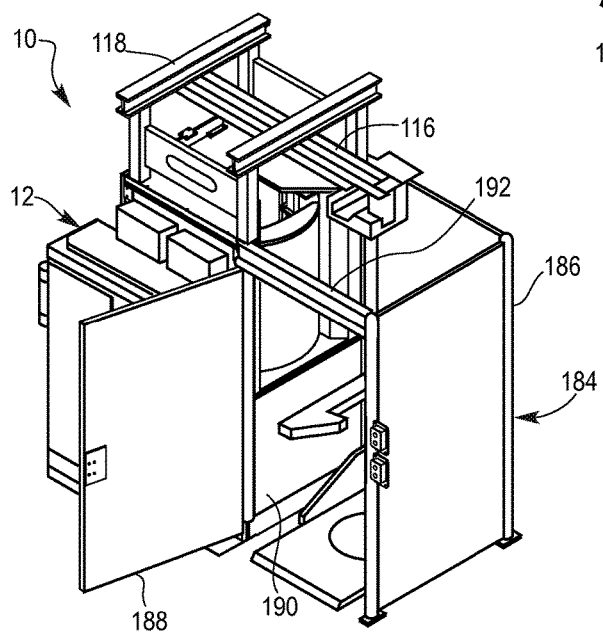
FIG. 20 is a perspective view of a fluid delivery device having an access area in a left hand configuration, according to an embodiment described herein.

Referring to FIGS. 18-20, the fluid delivery device 10 may further include an access area 184. In one embodiment, the access area 184 defines a perimeter substantially surrounding an area adjacent to a side of the melter 12 that the opening 22 is formed in. Thus, the access area 184 may substantially surround, together with the melter 12, a loading area where the container 'C' is secured in the chuck 134 and is transported into the loading chamber 18. That is, in one embodiment, the access area 184, together with at least one side of the melter 12, define an area within which the container 'C' may be secured by the chuck 134 and moved into the loading chamber 18. The loading platform 70 may be enclosed within the access area 184.

In one embodiment, the access area 184 is formed having three sides, such that when positioned against a side of the melter 12, the access area 184 and melter 12 define a substantially square or rectangular area. However, it is understood that the present disclosure is not limited to this configuration. For example, the access area 184 may be formed to define an area having another polygonal shape, or alternatively, a circular or elliptical shape. In some embodiments, the access area 184 may be formed with four sides, where one side includes an opening corresponding to the opening 22 in the melter 12, to allow the container 'C' to move into and out of the loading chamber 18. In other embodiments, the access area 184 is formed having an open side, and the melter 12 may be positioned at the open side with the opening 22 of the melter 12 facing the area defined by the access area 184.

The access area 184 may include one or more panels 186. In one embodiment, the access area 184 includes a plurality of panels 186. One panel 186 may be formed as a door 188, or alternatively, may be omitted, to form an access section 190, for allowing a user access to an interior of the access area 184. In use, the access section 190 may allow a user or operator to position a container 'C' within the access area 184 and secure the container 'C' within the chuck 134. Thus, the handle 164 of the chuck 134 is generally aligned with and positioned nearest to the access section 190 so that the operator may manipulate the handle 164 to operate the chuck 134.

The access area 184 may further include a cage frame 192 to which the one or more panels 186 and door 188 may be secured. The cage frame 192 may be secured to the melt 12. Alternatively, the cage frame 192 may be self-supported. It is understood, however, that the cage frame 192 is not required, and the one or more panels 186 and door 188 may be secured to one another and be self-supported.

In one embodiment, the access area 184 is reconfigurable, so that the location of the door 188 and/or access section 190 may be moved relative to the melter 12. Accordingly, each panel 186 and the door 188 may be releasably secured to the cage frame 192, an adjacent panel 186, or the melter 12.

In another embodiment, the access area 184 may be formed by two clamshell doors (not shown) rotatably secured to opposite sides of the cage frame. In one example, each clamshell door may be formed with a first leg and second leg angled relative to the first leg. In a closed position, the first leg of each door restricts access to the loading area on opposite sides of the loading area, while the second legs, together, restrict access to a front side of the loading area facing the melter 12. Thus, in this configuration, the two clamshell doors may restrict access around three sides of a generally square or rectangularly shaped area. A fourth side may be open to the melter 12. In addition an access section 190 may be formed on the fourth side between the melter 12 and the loading area. That is, the loading area, including the loading platform 70, may be spaced sufficiently from the melter 12 to allow an operator between the melter 12 and the loading area for manipulating the chuck 134 and/or operating a control panel (not shown). Another door (not shown) may be positioned between the melter 12 and the clamshell doors to restrict access to the space and access section 190 between the loading area and the melter 12. The clamshell doors, in an open position, allow access to three sides of the loading area. Alternatively, the clamshell doors may be curved or partially circular in shape.

In one example, multiple configurations may include a right side configuration, as shown in FIG. 18, where the door 188 and access section 190 are positioned on a right hand side when facing the opening 22 of the melter 12. Alternatively, the access area 184 may be formed having a front configuration, as shown in FIG. 19, where the door 188 and access section 190 are positioned in front of the opening 22 when facing the melter 12, or a left hand configuration, shown in FIG. 20, where the door 188 and access section 190 are positioned on the left hand side when facing the opening 22 of the melter 12.

Referring to FIGS. 15-17 and 18-20, the chuck 134 may be moved between the first configuration, second configuration and third configuration to correspond to a configuration of the access area 184, and in particular, a position of the door 188 and/or access section 190 of the access area 184, so that the handle 164 is positioned nearest the door 188 or access section 190, and the first arm 148 and second arm 150 open to receive the container 'C' therebetween from a direction corresponding to the position of the door 188 or access section 190. For example, in the right hand configuration of the access area 184, as shown in FIG. 18, the chuck 134 may be in the first configuration as shown in FIG. 15. In the front configuration of the access area 184, as shown in FIG. 19, the chuck 134 may be rotated approximately ninety degrees to the second configuration shown in FIG. 16. Further, in the left hand configuration of the access area 184, as shown in FIG. 20, the chuck 134 may be rotated another ninety degrees (one hundred eighty degrees from the first configuration of FIG. 15), approximately, to the third configuration as shown in FIG. 17.

It is understood that the configurations described above are for the purposes of example only and the present disclosure is not limited to those configurations. For example, the chuck 134 may rotate at intervals other than ninety degrees to move between different configurations, and the linkage bracket 158 and linkage counterweight 160 may be positioned or fixed relative to the crossbar 156 at positions other than the aligned and perpendicular positions shown in the figures.

The access area 184 may be used to partition a loading and transport area of the container 'C', within the access area 184, from an adjacent portion of the facility where the fluid delivery device 10 is used. Accordingly, loading of the container 'C' into the loading chamber 18, and removal of the container 'C' therefrom, may occur in a substantially partitioned area where inadvertent interference from or with other moving objects within the facility may be avoided.

A plurality of sensors may be positioned through the fluid delivery device 10 to measure, for example, a position of the container 'C', a level of adhesive in the hopper 20, whether a slug of adhesive has dropped from the container 'C' into the hopper 20, a clamping force applied to the container 'C' from the chuck 134, and whether the handle 164 is locked secured in the clamping position. Sensors may measure, detect or record various other conditions as well. The sensors may be communicably connected with the controller 68, which is, in turn communicably and operatively connected with various features of the fluid delivery device 10, including, for example, the lifting mechanism 122, the container handling system 14, 114, the door 30, the heating element 28 and/or the pump system 16, and individual components thereof. Accordingly, once the container 'C' is loaded and secured in the chuck 134, the container 'C' may be autonomously loaded into the loading chamber 18 and removed when empty. In one embodiment, the fluid delivery device 10 may include, for example, a cable carrier 194 (see FIG. 11) to house cables or wiring to accommodate such communication.

In operation, according to the embodiments above, a full container 'C' may be received within the access area 184 through the access section 190 and/or door 188. An operator may secure the container 'C' in the chuck 134 by operating the clamping mechanism 162. The lifting mechanism 122, for example, a hoist, may be secured to the chuck 134 by coupling a distal end of the flexible member 124 to the lug 157. The second coupling piece 132 of the stabilizing linkage 126 is coupled to the chuck 134 as well.

The door 188 of the access area 184 may be closed and the lifting mechanism 122 may be operated to lift the container 'C' to a predetermined height sufficient for loading into the loading chamber 18 of the melter 12. The stabilizing linkage 126, namely the scissor-type linkage 128 may move from an extended condition to a retracted condition as the container 'C' is lifted. The stabilizing linkage 126 is configured to stabilize the container 'C' as it is lifted, by preventing or limiting twisting, swinging or rotation of the container 'C'. Either during, or after the container 'C' is lifted to the predetermined height, the trolley 120 may be driven, for example, by the motor, to move along the rail 116 to transport the container 'C' toward the melter 12 and into the loading chamber 18 through the opening 22.

Upon positioning the container 'C' in the loading chamber 18, the door 30 may be moved to the closed position across the opening 22. The container 'C' is held vertically by the chuck 134 and the lifting system 122 extending through the slot 26 in the cover 24. Movement of the door 30 to the closed position causes the first heating element 28 to move from the receiving position (FIG. 4) to the heating position (FIG. 5). Movement of the heating element 28 from the receiving position to the heating position may impart a rotational force on the container 'C'. This rotational force may be transferred to the first coupling piece 130 via the chuck 134, second coupling piece 132 and the stabilizing linkage 126. The first coupling piece 130, which may include a block of elastomeric material, may twist in response to the rotational force to absorb the rotation force to absorb the rotational force. The first heating element 28, for example, one or more heating bands, may then be energized or heated to transfer heat to the container 'C' and the slug of adhesive held therein. The heat transferred from the heating element 28 causes an outer portion of the adhesive to melt allowing the slug adhesive to drop from the container 'C', though the aperture 54 and into the hopper 20.

The slug of adhesive continues to be heated in the hopper 20 by the second heating element 55 and becomes fluid. The pump assembly 16 is operated to pump the fluid through one or more output ports 62 to one or more metering stations (not shown) or fluid application devices (not shown). The pressure of the fluid discharged through the one or more output ports 62 may be controlled by one or more PRVs 64 associated with each output port 62.

After the container 'C' is emptied of its contents (i.e., the adhesive slug), the door 30 may be opened and the first heating element 28 may be moved from the heating position to the receiving position. The trolley 120 may then be driven along the rail 116 to remove the container 'C' from the loading chamber 18 through the opening 22. Once clear of the melter 12 by a suitable distance, the lifting mechanism 122 may be operated to lower the container 'C' and the stabilizing linkage 126, and in particular, the scissor-type linkage 128 may be extended. An operator may open the door 188 or access the chuck 134 through the access section, operate the clamping mechanism 162 to release the clamping force on the container 'C' and remove the container 'C' from the chuck 134. A new container 'C' having a slug of adhesive stored therein may then be placed and secured within the chuck 134.

In the embodiments above, an empty container 'C' may be removed and replaced with a new container 'C' container while an adhesive supply is maintained in the hopper 20. The new container may be heated and additional adhesive may be added to hopper 20 before the supply in the hopper 20 is exhausted. Accordingly, a constant supply of adhesive may be provided in the hopper 20 to be delivered to one or metering stations and/or one or more fluid application devices. The containers 'C' may be changed out and replaced without stopping delivery of the fluid from the hopper in the melter 12 to the metering stations or fluid application devices.

Figure 21:
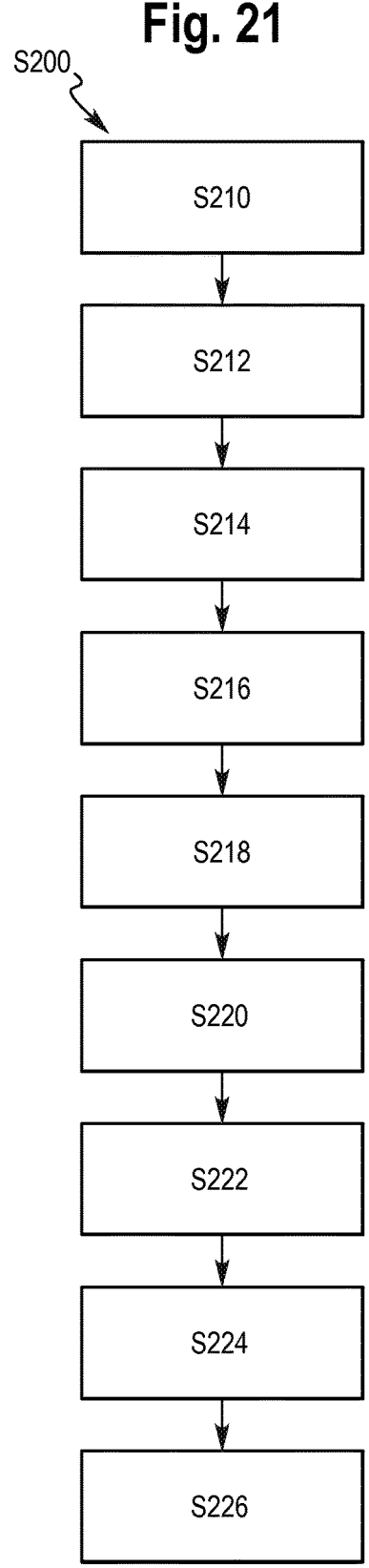
FIG. 21 is a diagram showing a method of operating a fluid delivery device according to the embodiments described herein.

FIG. 21 is a diagram showing a method of operating a fluid delivery device described herein, according to one embodiment. The method is shown generally at S200 and includes, at S210, lifting the container 'C', with the lifting mechanism 122, to a predetermined height corresponding to the opening 22. At S212, the container 'C' is transported, by the trolley 120, from a position remote from the melter 12 to an interior of the loading chamber 18 through the opening 22. At S214, the door 30 is moved from the open position to the closed position and at S216, the one or more first heating elements 28 are moved from the receiving position to the heating position. At S218 the heating elements 28 is energized to heat the container 'C' and the contents thereof. The contents may be a hot melt adhesive. With continued heating, as shown at S220, the contents of the container 'C' are received in the hopper 20. At S222, the hopper 20 continues to melt the contents (e.g., a hot melt adhesive) with the second heating element 55. At S224, the pump assembly 16 discharges that melted adhesive to one or more metering stations and/or one more fluid application devices. In some embodiments, the fluid discharged by the pump assembly 16 may be discharged at one or more output port 62, and the pressure of the discharged fluid may be regulated, at each output port 62 by a pressure regulating valve 64, as shown at S226.

It is understood that various features and components described in any of the embodiments above may be used in combination with, or in place of other features and components described in different embodiments above.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A fluid delivery device comprising:
a melter having a loading chamber and a hopper disposed in communication with the loading chamber, the loading chamber having an opening and one or more first heating elements disposed within the loading chamber and the hopper having a second heating element disposed within the hopper;
a container handling system configured to lift a container having contents stored therein in a first direction to a predetermined height, and to move the container in a second direction to a position within the loading chamber, wherein the container handling system is configured to support the container within the loading chamber, the container handling system comprising a rail extending from a first position remote from the melter to a second position above the melter and a trolley coupled to the rail and configured to move along the trolley rail from the first position to the second position, the trolley configured for coupling to the container to move the container in the second direction;

an access area defining a perimeter adjacent to the melter, the access area including an access section configured to allow access to an interior area defined by the access area, wherein the container handling system is configured to move the container in the second direction from a position within the access area to the position within the loading chamber; and a pump system in fluid communication with the hopper, the pump system comprising at least one pump, at least one inlet in fluid communication with the hopper and at least one output port, wherein the loading chamber is configured to receive the container through the opening, the one or more first heating elements are configured to heat the contents within the container while the container is supported by the container handling system, the hopper is configured to receive and melt the contents from the container with the second heating element to provide a fluid and the pump system is configured to deliver the fluid from the hopper.

2. The fluid delivery device of claim 1, wherein the container handling system further comprises:

a chuck configured to selectively apply a clamping force on the container to secure the container therein;

a lifting mechanism coupled at one end to the trolley and at an opposite end to the chuck, the lifting mechanism configured to lift the container in the first direction to the predetermined height; and a stabilizing linkage having a first end coupled to the trolley and a second end coupled to the chuck.

3. The fluid delivery device of claim 2, wherein the chuck comprises a clamping band having a first arm and a second arm each rotatably mounted on a guide band, the first arm and the second arm movable to receive the container therebetween and apply the clamping force to the container.

4. The fluid delivery device of claim 3, the chuck further comprising a support bracket, the support bracket having a linkage bracket and linkage counterweight rotatably secured thereto, the linkage bracket being secured to the second end of the stabilizing linkage.

5. The fluid delivery device of claim 2, wherein the lifting mechanism comprises a hoist coupled to the trolley and a flexible member configured for winding and unwinding on the hoist, the flexible member securable to the chuck.

6. The fluid delivery device of claim 2, wherein the stabilizing linkage comprises a scissor-type linkage movable between an extended position and a retracted position, a first coupling piece connected between the scissor-type linkage and the trolley, and a second coupling piece coupled between the scissor-type linkage and the chuck.

7. The fluid delivery device of claim 6, wherein the first coupling piece is formed from a resilient material.

8. The fluid delivery device of claim 6, wherein the second coupling piece comprises and L-shaped bracket connected to the scissor-type linkage and an L-shaped plate connected between the L-shaped bracket and the chuck, wherein the L-shaped bracket is rotatable relative to the scissor-type linkage about a first axis, and the L-shaped plate is rotatable relative to the L-shaped bracket about a second axis non-parallel to the first axis.

9. The fluid delivery device of claim 1, wherein the access area further comprises a door at the access section.

10. The fluid delivery device of claim 1, wherein the access area further comprises a plurality of panels, wherein one or more panels of the plurality of panels and the access section are repositionable relative to one another such that the access area is reconfigurable.

11. The fluid delivery device of claim 1, wherein the melter further comprises a melter door selectively movable across the opening to open or close the opening of the loading chamber.

12. The fluid delivery device of claim 1, wherein the one or more first heating elements of the loading chamber includes one or more flexible heating bands, the flexible heating bands movable between a receiving position where the flexible heating bands are configured to receive container therein, and a heating position, where the flexible heating bands are configured to extend substantially about a perimeter of the container.

13. A fluid delivery device comprising:

a melter having a loading chamber and a hopper disposed in communication with the loading chamber, the loading chamber having an opening and one or more first heating elements disposed therein and the hopper having a second heating element disposed therein;

a container handling system configured to lift a container having contents stored therein in a first direction to a predetermined height, and to move the container in a second direction from a position remote of the melter to a position within the loading chamber;

an access area defining a perimeter adjacent to the melter, the access area including an access section configured to allow access to an interior area defined by the access area; and a pump system in fluid communication with the hopper, the pump system comprising at least one pump, at least one inlet in fluid communication with the hopper and at least one output port, wherein the loading chamber is configured to receive the container through the opening, the one or more first heating elements are configured to heat the contents within the container, the hopper is configured to receive and melt the contents from the container with the second heating element to provide a fluid and the pump system is configured to deliver the fluid from the hopper, wherein the one or more first heating elements of the loading chamber includes one or more flexible heating bands, the flexible heating bands movable between a receiving position where the flexible heating bands are configured to receive the container therein, and a heating position, where the flexible heating bands are configured to extend substantially about a perimeter of the container, and wherein a lead-in skirt guard is positioned on a lowermost flexible heating band of the one or more flexible heating bands, the lead-in skirt guard comprising a body having one or more fastening arms extending from a first edge of the body and one or more tabs extending from a second edge of the body at a non-zero angle relative to the body, the lowermost flexible heating band extending between the one or more fastening arms and the one or more tabs.

14. The fluid delivery device of claim 1, further comprising at least one pressure regulating valve connected to the pump assembly, the at least one pressure regulating valve configured to regulate a pressure of the fluid discharged from the at least one output port.

15. The fluid delivery device of claim 14, wherein the pump assembly includes more than one output port and respective pressure regulating valves of the at least one pressure regulating valves are associated with each output port to independently regulate a pressure of the fluid discharged from each output port.

16. The fluid delivery device of claim 14, further comprising a controller configured to selectively control the at least one pressure regulating valve.

17. A fluid delivery device comprising:
a melter having a loading chamber and a hopper disposed in communication with the loading chamber, the loading chamber having an opening, a door selectively movable across the opening, and one or more flexible heating elements disposed within the loading chamber, the hopper having a second heating element disposed within the hopper;
a pump system in fluid communication with the hopper configured to deliver a fluid from the hopper to one or more remotely positioned fluid application devices; and
a container handling system comprising a rail fixed relative to the melter and a trolley movable on the rail to move a container between a position remote of the melter and a position within the loading chamber,
wherein the loading chamber is disposed above the hopper and the hopper is disposed in communication with the loading chamber by way of an aperture, and
wherein the hopper is configured to receive contents of the container through the aperture and the second heating element is configured to melt the contents.

* * * * *